US012283117B2

(12) United States Patent
 Kohler et al.

(10) Patent No.: US 12,283,117 B2
(45) Date of Patent: *Apr. 22, 2025

(54) SYSTEMS AND METHODS FOR AUTOMATED LICENSE PLATE RECOGNITION

(71) Applicant: Hayden AI Technologies, Inc., Oakland, CA (US)

(72) Inventors: Morgan Kohler, Mill Valley, CA (US); Bo Shen, Fremont, CA (US)

(73) Assignee: Hayden AI Technologies, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,670

(22) Filed: Jan. 22, 2024

(65) Prior Publication Data
 US 2025/0078538 A1   Mar. 6, 2025

Related U.S. Application Data

(63) Continuation of application No. 18/458,631, filed on Aug. 30, 2023, now Pat. No. 11,915,499.

(51) Int. Cl.
 *G06K 9/00* (2022.01)
 *G06V 10/94* (2022.01)
 (Continued)

(52) U.S. Cl.
 CPC ............ *G06V 20/625* (2022.01); *G06V 10/95* (2022.01); *G06V 20/58* (2022.01); *G06V 30/153* (2022.01);
 (Continued)

(58) Field of Classification Search
 CPC ...... G06V 20/625; G06V 10/95; G06V 20/58; G06V 30/153; G06V 30/18; G06V 30/19147; G06V 30/1916
 See application file for complete search history.

(56) References Cited

U.S. PATENT DOCUMENTS 9,070,289 B2   6/2015   Saund et al.
10,296,794 B2  5/2019   Ratti
(Continued)

FOREIGN PATENT DOCUMENTS

CN    2277104     3/1998
CN   101751785    6/2010
(Continued)

OTHER PUBLICATIONS

License Plate Recognition From Still Images and Video Sequences: A Survey, Christos-Nikolaos E et al., IEEE, 2008, pp. 377-391 (Year: 2008).*
(Continued)

*Primary Examiner* — Jayesh A Patel
(74) *Attorney, Agent, or Firm* — Chang & Hale LLP

(57) ABSTRACT

Disclosed herein are methods, systems, and apparatus for automated license plate recognition and methods for training a machine learning model to undertake automated license plate recognition. For example, a method can comprise dividing an image or video frame comprising a license plate into a plurality of image patches, determining a positional vector for each of the image patches, adding the positional vector to each of the image patches and inputting the image patches and their associated positional vectors to a text-adapted vision transformer. The text-adapted vision transformer can be configured to output a prediction concerning the license plate number of the license plate.

20 Claims, 12 Drawing Sheets

(51) Int. Cl.
*G06V 20/58* (2022.01)
*G06V 20/62* (2022.01)
*G06V 30/148* (2022.01)
*G06V 30/18* (2022.01)
*G06V 30/19* (2022.01)

(52) U.S. Cl.
CPC ........ *G06V 30/18* (2022.01); *G06V 30/19147* (2022.01); *G06V 30/1916* (2022.01)

(56) References Cited

U.S. PATENT DOCUMENTS

| | | | |
|---|---|---|---|
| 10,438,083 B1* | 10/2019 | Rivard | G06V 30/153 |
| 10,963,719 B1* | 3/2021 | Hantehzadeh | G06F 18/24 |
| 11,003,919 B1 | 5/2021 | Ghadiok et al. | |
| 11,164,014 B1 | 11/2021 | Ghadiok et al. | |
| 11,322,017 B1 | 5/2022 | Ghadiok et al. | |
| 11,361,558 B2 | 6/2022 | Seo | |
| 11,688,182 B2 | 6/2023 | Ghadiok et al. | |
| 11,689,701 B2* | 6/2023 | Ghadiok | G06F 18/2163 348/148 |
| 11,915,499 B1 | 2/2024 | Kohler et al. | |
| 2002/0072847 A1 | 6/2002 | Trajkovic et al. | |
| 2010/0081200 A1 | 4/2010 | Rajala et al. | |
| 2012/0148092 A1 | 6/2012 | Ni et al. | |
| 2013/0266188 A1 | 10/2013 | Bulan et al. | |
| 2014/0007762 A1 | 1/2014 | Gavish et al. | |
| 2014/0036076 A1 | 2/2014 | Nerayoff et al. | |
| 2014/0219561 A1* | 8/2014 | Nakamura | G06V 30/40 382/176 |
| 2014/0311456 A1 | 10/2014 | Richter et al. | |
| 2015/0054975 A1* | 2/2015 | Emmett | H04N 23/667 348/220.1 |
| 2018/0121744 A1* | 5/2018 | Kim | G06V 10/993 |
| 2018/0172454 A1 | 6/2018 | Ghadiok et al. | |
| 2018/0240336 A1 | 8/2018 | Kareev et al. | |
| 2019/0137280 A1 | 5/2019 | Ghadiok et al. | |
| 2019/0197369 A1 | 6/2019 | Law et al. | |
| 2019/0251369 A1* | 8/2019 | Popov | G06V 20/54 |
| 2020/0063866 A1 | 2/2020 | Reinhart et al. | |
| 2020/0177767 A1 | 6/2020 | Kelly et al. | |
| 2020/0380270 A1 | 12/2020 | Cox et al. | |
| 2020/0401833 A1* | 12/2020 | Popov | G06V 20/41 |
| 2021/0027083 A1* | 1/2021 | Cohen | G06V 10/255 |
| 2021/0166145 A1 | 6/2021 | Omari et al. | |
| 2021/0209941 A1 | 7/2021 | Maheshwari et al. | |
| 2021/0237737 A1 | 8/2021 | Al-Nuaimi et al. | |
| 2021/0241003 A1 | 8/2021 | Seo | |
| 2021/0342624 A1* | 11/2021 | Wang | A47L 9/2857 |
| 2022/0122351 A1* | 4/2022 | Chen | G06N 3/08 |
| 2022/0147745 A1 | 5/2022 | Ghadiok et al. | |
| 2023/0147685 A1* | 5/2023 | Koch | G06V 30/147 382/103 |
| 2023/0162481 A1* | 5/2023 | Yuan | G06T 9/00 382/159 |
| 2023/0186668 A1* | 6/2023 | Dong | G06F 40/114 382/176 |
| 2023/0196710 A1* | 6/2023 | Pan | G06N 3/0455 382/173 |
| 2023/0245435 A1* | 8/2023 | Zhao | G06V 10/806 382/176 |

FOREIGN PATENT DOCUMENTS

| | | | |
|---|---|---|---|
| CN | 101751785 A * | 6/2010 | |
| CN | 101789080 | 7/2010 | |
| CN | 101789080 A * | 7/2010 | |
| CN | 103971097 | 8/2014 | |
| CN | 103971097 A * | 8/2014 | |
| CN | 106407981 | 2/2017 | |
| CN | 106407981 A * | 2/2017 | G06K 9/3233 |
| CN | 106560861 | 4/2017 | |
| CN | 106650729 | 5/2017 | |
| CN | 106650729 A * | 5/2017 | |
| CN | 109858327 | 6/2019 | |
| CN | 109858327 A * | 6/2019 | |
| CN | 110197589 | 9/2019 | |
| CN | 110321823 | 10/2019 | |
| CN | 110717433 | 1/2020 | |
| CN | 111368687 | 7/2020 | |
| CN | 111492416 | 8/2020 | |
| CN | 111666853 | 9/2020 | |
| JP | 4805763 | 3/2008 | |
| KR | 20030009149 | 1/2003 | |
| KR | 20030009149 A * | 1/2003 | |
| KR | 100812397 | 3/2008 | |
| KR | 100812397 B1 * | 3/2008 | |
| KR | 101607912 | 3/2016 | |
| KR | 101607912 B1 * | 3/2016 | |
| WO | WO 2010/081200 | 7/2010 | |
| WO | WO 2014/007762 | 1/2014 | |
| WO | WO 2020/063866 | 4/2020 | |
| WO | WO 2020/177767 | 9/2020 | |
| WO | WO 2022/099237 | 5/2022 | |

OTHER PUBLICATIONS

Toward End-to-End Car License Plate Detection and Recognition With Deep Neural Networks, Hui Li et al., IEEE, 2019, pp. 1126-1136 (Year: 2019).*
Vehicle License Plate Recognition Based on Extremal Regions and Restricted Boltzmann Machines, Chao Gou et al., IEEE, 2016, pp. 1096-1107 (Year: 2016).*
MultiPath ViT OCR: A Lightweight Visual Transformer-based License Plate Optical Character Recognition, Alireza Azadbakht et al., ICCKE , 2022, pp. 092-095 (Year: 2022).*
License Plate Character Recognition via Signature Analysis and Features Extraction, Lorita Angeline, et al., IEEE, 2012, pp. 1-6 (Year: 2012).*
A robust license plate detection and recognition system based on DETR and CNN, Elsevier, 2022, pp. 1-10 (Year: 2022).*
A Robust License Plate Recognition Model Based on Bi-LSTM, Yongjie Zou et al., IEEE, 2020, pp. 211630-211641 (Year: 2020).*
License Plate Segmentation and Recognition of Chinese Vehicle Based on BPNN, Wang Naiguo, Zhu Xiangwei et al., Computer Society, 2016, pp. 403-406 (Year: 2016).*
Research on License Plate Recognition Algorithms Based on Deep Learning in Complex Environment, Wang Weihong et al., IEEE, 2020, pp. 91661-91675 (Year: 2020).*
RobustScanner: Dynamically Enhancing Positional Clues for Robust Text Recognition, Xiaoyu Yue et al., Springer, 2020, pp. 135-151 (Year: 2020).*
Vehicle Plate Recognition for Wireless Traffic Control and Law Enforcement System, Francisco Alegria et al., IEEE, 2006, pp. 1800-1804 (Year: 2006).*
Safe Fleet ClearLane, 2021, pp. 1-2 (Year: 2021).*
ALPR—An Intelligent Approach Towards Detection and Recognition of License Plates in Uncontrolled Environments, Akshay Baksh et al., Springer, 2023, pp. 253-269 (Year: 2023).*
Robust license plate detection and recognition with automatic rectification, Degui Xiao et al., JOEI, 2021, pp. 013002-1 to 013002-20 (Year: 2021).*
Traffic Signal Violation Detection using Artificial Intelligence and Deep Learning, Ruben J. Franklin et al., IEEE, 2020, pp. 839-844 (Year: 2020).*
Traffic Rules Violation Detection using Deep Learning, Aniruddha Tonge et al., IEEE, 2020, pp. 1250-1257 (Year: 2020).*
Alireza Azadbakht et al., MultiPath Vit OCR: A Lightweight Visual Transformer-based License Plate Optical Character Recognition, ICCKE, 2022, pp. 029-095 (Year: 2022).
Chao Gou et al., Vehicle License Plate Recognition Based on Extremal Regions and Restricted Boltzmann Machines, IEEE, 2016, pp. 1096-1107 (Year: 2016).
Christos-Nikolaos E et al., License Plate Recognition From Still Images and Video Sequences: A Survey, IEEE, 2008, pp. 377-391 (Year: 2008).
Clearlane, "Automated Bus Lane Enforcement System", *SafeFleet*, 2021, online.

(56) References Cited

OTHER PUBLICATIONS

Elsevier, A robust license plate detection and recognition system based on DETR and CNN, pp. 1-10 (Year 2022).
Francisco Alegria et al., Vehicle Plate Recognition for Wireless Traffic Control and Law Enforcement System, IEEE, 2006, pp. 1800-1804 (Year: 2006).
Hui Li et al., Toward End-to-End Car License Plate Detection and Recognition With Deep Neural Networks, IEEE, 2019, pp. 1126-1136 (Year: 2019).
Lorita Angeline et al., License Plate Character Recognition via Signature Analysis and Features Extraction, IEEE, 2012, pp. 1-6 (Year: 2012).
Tongjie Zou et al., A Robust License Plate Recognition Model Based on Bi-LSTM, IEEE, 2020, p. 211630-211641 (Year: 2020).
Wang Weihong et al., Research on License Plate Recognition Algorithms Based on Deep Learning in Complex Environment, IEEE, 2020, pp. 91661-91675 (Year: 2020).
Xiaoyu Yue et al., RobustScanner: Dynamically Enhancing Positional Clues for Robust Text Recognition, Springer, 2020, pp. 135-151 (Year: 2020).
Zhu Ziangwei et al., License Plate Segmentation and Recognition of Chinese Vehicle Based on BPNN, Wang Naiguo, Computer Society, 2016, pp. 403-406 (Year: 2016).
"Consulting services in Computer Vision and AI," accessed on May 8, 2023, online.
"Safety Vision Announces Smart Automated Bus Lane Enforcement (SABLE™) Solution," *Safety Vision*, Oct. 11, 2022, online.
Bo, T. et al., "Common phase error estimation in coherent optical OFDM systems using best-fit bounding box," *Optics Express*, vol. 24, No. 21, pp. 73707-23718, Oct. 2016.
Bo, T. et al., "Common Phase Estimation in Coherent OFDM System Using Image Processing Technique," *IEEE Photonics Technology Letters*, vol. 27, No. 15, pp. 1597-1600, Aug. 2015.
Bo, T. et al., "Image Processing Based Common Phase Estimation for Coherent Optical Orthogonal Frequency Division Multiplexing System," *Optical Fiber Communication Conference*, Mar. 2015.
Canizo, M. et al. "Multi-Head CNN-RNN for multi time series anomaly detection: An industrial case study," *Neurocomputing*, vol. 363(21), pp. 246-260, Oct. 21, 2019.
Chen, S. et al., "A Dense Feature Pyramid Network-Based Deep Learning Model for Road Marking Instance Segmentation Using MLS Point Clouds," *IEEE Transactions on Geoscience and Remote Sensing*, vol. 59, No. 1, pp. 784-800, Jan. 2021.
Chhaya, S. et al., "Basic Geometric Shape and Primary Colour Detection Using Image Processing on MATLAB," *IJRET: International Journal of Research in Engineering and Technology*, vol. 04, iss. 05, pp. 505-509, May 2015.
Clearlane, "The Safe Fleet Automated Bus Lane Enforcement (ABLE)", *SafeFleet*, 2021, online.
Evanko, K. "Siemens Mobility launches first-ever mobile bus lane enforcement solution in New York," *Siemens Mobility*, Dec. 17, 2019, Munich, Germany.
Fan, Y. et al., "A Coarse-to-Fine Framework for Multiple Pedestrian Crossing Detection," *Sensors*, vol. 20, 4144, pp. 1-16, Jul. 2020.
Franklin, R. "Traffic Signal Violation Detection using Artificial Intelligence and Deep Learning," *Department of Electronic & Telecommunication Engineering, RV College of Engineering*, pp. 839-844, accessed on Jul. 19, 2020, Karnataka, India.
Github Repository, Our Camera, <https://github.com/Bellspringsteen/OurCamera> (last visited Sep. 25, 2023).
Glenn, J., "Adaptive Morphological Feature-Based Object Classifier for a Color Imaging System," *NASA Tech Briefs*, pp. 23-24, Dec. 2009.
Hsu, K., et al. "Augmented Multiple Instance Regression for Inferring Object Contours in Bounding Boxes," *IEEE Transaction on Image Processing*, vol. 23, No. 4, pp. 1722-1736, Apr. 2014.
Huval, B. et al. "An Empirical Evaluation of Deep Learning on Highway Driving," *Stanford University*, pp. 1-7 accessed on Apr. 17, 2015, online.
Liu, X. "Vehicle-Related Scene Understanding Using Deep Learning," *School of Engineering, Computer and Mathematical Sciences, Auckland University of Technology*, 2019, online.
Nehemiah, A. et al. "Deep Learning for Automated Driving with MATLAB," *Nvidia Technical Blog*, <https://developer.nvidia.com/blog/deep-learning-automated-driving-matlab/> accessed on Jun. 4, 2023, online.
Novak, L., "Vehicle Detection and Pose Estimation for Autonomous Driving," *Czech Technical University in Prague*, May 2017.
Oh, J. et al., "Context-based abnormal object detection using the fully-connected conditional random fields," *Pattern Recognition Letters*, vol. 98, pp. 16-25, Aug. 2017.
Paquet, E. et al., "Description of shape information for 2-D and 3-D objects," *Signal Processing: Image Communication*, vol. 16, pp. 103-122, Sep. 2000.
Safe Fleet. "Whitepaper: Vendor Interoperability for ABLE," *Safe Fleet*, pp. 1-6, Apr. 2023, online.
Sengupta, S., "Semantic Mapping of Road Scenes," *Oxford Brookes University*, Oct. 2014.
Siemens Mobility Inc., "Ratification of Completed Procurement Actions," New York City Transit and Siemens Mobility Inc., *Finance Committee Meeting*, pp. 80-81, Mar. 2019.
Siemens Mobility Traffic Solutions, "Enforcement solutions for safe and efficient cities," *Civil Enforcement*, 2016.
Spencer, B. et al., "NYC extends Brooklyn bus lane enforcement," *ITS International*, Feb. 27, 2020, online.
Sullivan, T., "Transit Bus Surveillance Solutions," *New York City Transit/MTA Bus*, Jun. 21, 2019, Charlotte, North Carolina, USA.
Tonge, A. et al., "Traffic Rules Violation Detection using Deep Learning," *2020 4th International Conference on Electronics, Communication and Aerospace Technology (ICECA)*, pp. 1250-1257, Nov. 2020, Coimbatore, India.
Viorel, C., "Some Aspects Concerning Geometric Forms Automatically Find Images and Ordering Them Using Robot Studio Simulation," *Advanced Materials Research*, vol. 1036, pp. 760-763, Oct. 1, 2014.
Wu, C. et al., "Adjacent Lane Detection and Lateral Vehicle Distance Measurement Using Vision-Based Neuro-Fuzzy Approaches," *Journal of Applied Research and Technology*, vol. 11, pp. 251-258, Apr. 2013.
Zhao Z. et al., "Deep Reinforcement Learning Based Lane Detection and Localization," *Neurocomputing*, vol. 413, pp. 328-338, Jul. 2020.
Zhou, C. et al., "Predicting the passenger demand on bus services for mobile users," *Pervasive and Mobile Computing*, vol. 25, pp. 48-66, Jan. 2016.

\* cited by examiner

CARRIER VEHICLE 110

MUNICIPAL FLEET VEHICLE

SEMI-AUTONOMOUS VEHICLE

AUTONOMOUS VEHICLE

SYSTEMS AND METHODS FOR AUTOMATED LICENSE PLATE RECOGNITION

CROSS-REFERENCE TO RELATED APPLICATION

This application is a continuation of U.S. patent application Ser. No. 18/458,631 filed on Aug. 30, 2023, the content of which is incorporated herein by reference in its entirety.

TECHNICAL FIELD

This disclosure relates generally to the field of computer-based license plate recognition and, more specifically, to systems and methods for automated license plate recognition based in part on artificially-generated license plates.

BACKGROUND

License plate recognition algorithms play a pivotal role in modern traffic enforcement systems, revolutionizing the way authorities monitor and regulate traffic. These algorithms utilize computer-based techniques to accurately and efficiently read and interpret license plate information from images or video footage.

Automatic license plate recognition (ALPR) can drastically speed up the processing of enforcement events by automating the process of recognizing license plate numbers. Existing ALPR solutions tend to excel at reading license plates with typical configurations of between six and ten characters of the same standardized height which span the plate width and are centered with respect to the plate height. These solutions excel at reading license plates that do not include commonly mistaken characters (e.g., "I" and "1") and license plates with a clearly legible font.

However, many license plates, especially those in the United States, come in a seemingly infinite number of configurations which include stacked characters, smaller characters, and characters alongside graphics, or a combination thereof. To address such inconsistencies, many ALPR algorithms utilize hardcoded rules which look for certain patterns or rules tailored to each U.S. state. This solution has problems with future adaptability, since if a solution is specifically designed to work with a set number of characters and configurations, then new configurations will be outside the scope of such algorithms.

Therefore, improved computer-based license plate recognition methods and systems are needed that can automatically recognize license plates while being robust to the fluid nature of plate configurations. Such a solution should be generalizable such that there remains no large gap in performance between standard occurrences and rare occurrences of plate configurations. Such a solution should also be adaptable such that the system is robust to unseen configurations and domains.

SUMMARY

In some embodiments, disclosed is a machine-based method of recognizing license plates, comprising: dividing an image or video frame comprising a license plate in the image or video frame into a plurality of image patches, determining a positional vector for each of the image patches, adding the positional vector to each of the image patches, inputting the image patches and their associated positional vectors to a transformer encoder of a text-adapted vision transformer run on one or more devices, and obtaining a prediction, outputted by the text-adapted vision transformer, concerning the license plate number of the license plate.

The image or video frame can be divided horizontally and vertically to obtain the image patches. At least one of the image patches can comprise a portion of a character of a license plate number of the license plate. The positional vector can represent a spatial position of each of the image patches in the image or video frame.

In some embodiments, the image or video frame can be divided horizontally and vertically into an N×N grid of image patches, where N is an integer between 4 and 256 (or, more specifically, between 8 and 64).

In some embodiments, the text-adapted vision transformer can comprise a linear projection layer and the linear projection layer can be configured to flatten each image patch in the N×N grid of image patches to 1×((H/N)×(W/N)). In these embodiments, the resulting input to the transformer encoder can be M×1×((H/N)×(W/N)), where H is a height of the image or video frame in pixels, where W is a width of the image or video frame in pixels, and where M is equaled to N multiplied by N.

In some embodiments, the method can further comprise adding a two-dimensional vector representing a spatial position of each of the image pages.

In some embodiments, the text-adapted vision transformer can be run on an edge device. The edge device can be coupled to a carrier vehicle. The image or video frame can be captured using one or more cameras of the edge device while the carrier vehicle is in motion.

In some embodiments, the text-adapted vision transformer can be run on a server. In these embodiments, the image or video frame can be captured using one or more cameras of an edge device communicatively coupled to the server. The image or video frame can be transmitted by the edge device to the server. The edge device can be coupled to a carrier vehicle and the image or video frame can be captured by the one or more cameras of the edge device while the carrier vehicle is in motion.

In some embodiments, each character of the license plate number can be separately predicted by the transformer encoder of the text-adapted vision transformer.

In some embodiments, the text-adapted vision transformer can be trained on a plate dataset comprising a plurality of real plate-text pairs. The real plate-text pairs can comprise images or video frames of real-life license plates and an annotated license plate number associated with each of the real-life license plates.

In some embodiments, the real-life license plates in the plate dataset can comprise license plates with differing U.S. state plate aesthetics or configurations, license plates with differing non-U.S. country or region plate aesthetics or configurations, license plates with differing plate character configurations or styles, license plates with differing levels of blur associated with the images or video frames, license plates with differing levels of exposure associated with the images or video frames, license plates that are at least partly occluded, license plates that are at least partly corroded, and license plates that have at least some paint loss.

In some embodiments, the text-adapted vision transformer can be pre-trained on a plurality of image-text pairs prior to being trained on the plate dataset. The image-text pairs can comprise images or video frames of real-life objects comprising text and an annotation of the text.

In some embodiments, the text-adapted vision transformer can be further trained on artificially-generated plate-text pairs. The artificially-generated plate-text pairs can comprise images of non-real license plates artificially generated by a latent diffusion model and a non-real license plate number associated with each of the non-real license plates.

In some embodiments, the latent diffusion model can be trained using the plate dataset used to train the text-adapted vision transformer.

In some embodiments, the non-real license plate number can be generated by a random plate number generator. At least one of the images of the non-real license plates can be generated based on the non-real license plate number and one or more plate features provided as inputs to the latent diffusion model.

In some embodiments, the one or more plate features can comprise at least one of a U.S. state plate aesthetic or configuration, a non-U.S. country or region plate aesthetic or configuration, a plate configuration or style, a level of noise associated with a license plate image, a level of blur associated with the license plate image, a level of exposure associated with the license plate image, a level of occlusion associated with the license plate image, a level of corrosion associated with the license plate in the license plate image, and a level of paint loss associated with the license plate in the license plate image.

Also disclosed is a method of training a machine learning model to undertake automated license plate recognition. The method can comprise pre-training or initially training a text-adapted vision transformer on a plurality of image-text pairs. The image-text pairs can comprise images or video frames of real-life objects comprising text and an annotation of the text.

The method can also comprise training the text-adapted vision transformer on a plate dataset comprising a plurality of real plate-text pairs. The real plate-text pairs can comprise images or video frames of real-life license plates and an annotated license plate number associated with each of the real-life license plates.

The method can further comprise training the text-adapted vision transformer on artificially-generated plate-text pairs. The artificially-generated plate-text pairs can comprise images of non-real license plates artificially generated by a latent diffusion model and a non-real license plate number associated with each of the non-real license plates.

In some embodiments, the non-real license plate number can be generated by a random plate number generator. At least one of the images of the non-real license plates can be generated by the latent diffusion model based on the non-real license plate number and one or more plate features provided as inputs to the latent diffusion model.

In some embodiments, the one or more plate features can comprise at least one of a U.S. state plate aesthetic or configuration, a non-U.S. country or region plate aesthetic or configuration, a plate character configuration or style, a level of blur associated with a license plate image, a level of exposure associated with the license plate image, a level of occlusion associated with the license plate image, a level of corrosion associated with the license plate in the license plate image, and a level of paint loss associated with the license plate in the license plate image.

In some embodiments, the one or more plate features can be selected or changed based on an accuracy of predictions made by the text-adapted vision transformer.

In some embodiments, the method can further comprise providing a prompt to the latent diffusion model to generate additional images of non-real license plates based in part on common plate features resulting in low accuracy predictions made by the text-adapted vision transformer.

In some embodiments, the latent diffusion model can be trained using the same plate dataset used to train the text-adapted vision transformer.

Also disclosed is a device for recognizing license plates. The device can comprise one or more cameras configured to capture an image or video frame of a license plate of a vehicle and one or more processors. The one or more processors can be programmed to: divide the image or video frame comprising the license plate in the image or video frame into a plurality of image patches, determine a positional vector for each of the image patches, add the positional vector to each of the image patches, input the image patches and their associated positional vectors to a transformer encoder of a text-adapted vision transformer, and obtain a prediction, outputted by the text-adapted vision transformer, concerning the license plate number of the license plate.

The image or video frame can be divided horizontally and vertically to obtain the image patches. At least one of the image patches can comprise a portion of a character of a license plate number of the license plate. The positional vector can represent a spatial position of each of the image patches in the image or video frame.

Also disclosed is a server for recognizing license plates. The server can comprise one or more server processors programmed to: divide an image or video frame comprising a license plate in the image or video frame into a plurality of image patches, determine a positional vector for each of the image patches, add the positional vector to each of the image patches, input the image patches and their associated positional vectors to a transformer encoder of a text-adapted vision transformer, and obtain a prediction, outputted by the text-adapted vision transformer, concerning the license plate number of the license plate.

The image or video frame can be divided horizontally and vertically to obtain the image patches. At least one of the image patches can comprise a portion of a character of a license plate number of the license plate. The positional vector can represent a spatial position of each of the image patches in the image or video frame.

DETAILED DESCRIPTION

Figure 1A:
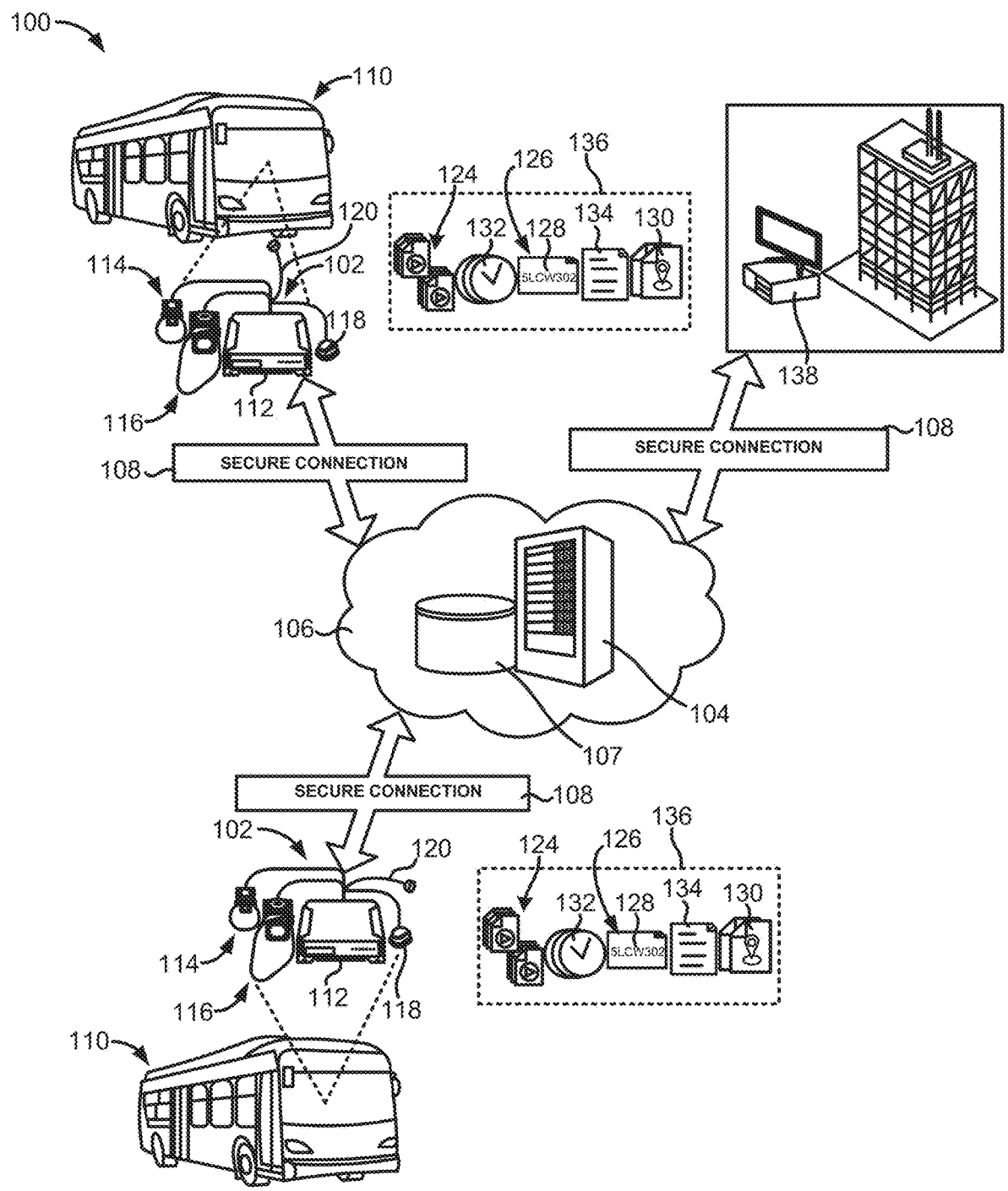
FIG. 1A illustrates one embodiment of a system for undertaking automated license plate recognition.

FIG. 1A illustrates one embodiment of a system 100 for undertaking automated license plate recognition. The system 100 can comprise one or more edge devices 102 communicatively coupled to or in wireless communication with a server 104 in a cloud computing environment 106.

The server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more stand-alone servers such as a rack-mounted server, a blade server, a mainframe, a dedicated desktop or laptop computer, one or more processors or processor cores therein, or a combination thereof.

The edge devices 102 can communicate with the server 104 over one or more networks. In some embodiments, the networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server 104 and the plurality of edge devices 102 can connect to the network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The edge devices 102 can transmit data and files to the server 104 and receive data and files from the server 104 via secure connections 108. The secure connections 108 can be real-time bidirectional connections secured using one or more encryption protocols such as a secure sockets layer (SSL) protocol, a transport layer security (TLS) protocol, or a combination thereof. Additionally, data or packets transmitted over the secure connection 108 can be encrypted using a Secure Hash Algorithm (SHA) or another suitable encryption algorithm. Data or packets transmitted over the secure connection 108 can also be encrypted using an Advanced Encryption Standard (AES) cipher.

The server 104 can store data and files received from the edge devices 102 at least one database 107 in the cloud computing environment 106. In some embodiments, the database 107 can be a relational database. In further embodiments, the database 107 can be a column-oriented or key-value database. In certain embodiments, the database 107 can be stored in a server memory or storage unit of the server 104. In other embodiments, the database 107 can be distributed among multiple storage nodes. In some embodiments, the database 107 can be an events database.

As will be discussed in more detail in the following sections, each of the edge devices 102 can be carried by or installed in a carrier vehicle 110 (see FIG. 1C for examples of different types of carrier vehicles 110).

For example, the edge device 102, or components thereof, can be secured or otherwise coupled to an interior of the carrier vehicle 110 immediately behind the windshield of the carrier vehicle 110. As a more specific example, the event camera 114 and the LPR camera 116 of the edge device 102 can be coupled to at least one of a ceiling and headliner of the carrier vehicle 110 with the event camera 114 and the LPR camera 116 facing the windshield of the carrier vehicle 110.

In other embodiments, the edge device 102, or components thereof, can be secured or otherwise coupled to at least one of a windshield, window, dashboard, and deck of the carrier vehicle 110. Also, for example, the edge device 102 can be secured or otherwise coupled to at least one of a handlebar and handrail of a micro-mobility vehicle serving as the carrier vehicle 110. Alternatively, the edge device 102 can be secured or otherwise coupled to a mount or body of an unmanned aerial vehicle (UAV) or drone serving as the carrier vehicle 110.

As shown in FIG. 1A, each of the edge devices 102 can comprise a control unit 112, an event camera 114, a license plate recognition (LPR) camera 116, a communication and positioning unit 118, and a vehicle bus connector 120.

The event camera 114 can capture videos of vehicles 122 (see, e.g., FIG. 1B) parked or in motion near the carrier vehicle 110. The videos captured by the event camera 114 can be referred to as event videos. Each of the event videos can be made up of a plurality of video frames 124.

For example, one or more processors of the control unit 112 can be programmed to apply a plurality of functions from a computer vision library 306 (see, e.g., FIG. 3) to the videos captured by the event camera 114 to read the video frames 124. The one or more processors of the control unit 112 can then pass at least some of the video frames 124 to a plurality of deep learning models (see, e.g., FIG. 3) run on the control unit 112 of the edge device 102. The deep learning models can automatically identify objects from the video frames 124 and classify such objects (e.g., a car, a truck, a bus, etc.). In some embodiments, the deep learning models can also automatically identify a set of vehicle attributes 134 of the vehicle 122. The set of vehicle attributes 134 can include a color of the vehicle 122, a make and model of the vehicle 122, and a vehicle type of the vehicle 122 (for example, if the vehicle 122 is a personal vehicle or a municipal vehicle such as a fire truck, ambulance, parking enforcement vehicle, police car, etc.).

The vehicle 122 can be detected along with other vehicles in the video frame(s) 124. In some embodiments, the vehicle 122 can be detected by the edge device 102 of committing a traffic violation such as a moving violation (e.g., a moving bus lane violation, a moving bike lane violation, etc.), a non-moving violation (e.g., parking or stopping in a lane or part of a roadway where parking or stopping is not permitted), or a combination thereof.

The LPR camera 116 can capture videos of license plates 126 of the vehicles 122 parked or in motion near the carrier vehicle 110. The videos captured by the LPR camera 116 can be referred to as license plate videos. Each of the license plate videos can be made up of a plurality of video frames 124. As will be discussed in more detail in later sections, the video frames 124 can be processed and analyzed by the control unit 112 in real-time or near real-time to extract alphanumeric strings representing license plate numbers 128 of the vehicles 122. The event camera 114 and the LPR camera 116 will also be discussed in more detail in later sections.

The communication and positioning unit 118 can comprise at least one of a cellular communication module, a WiFi communication module, a Bluetooth® communication module, and a high-precision automotive-grade positioning unit. The communication and positioning unit 118 can also comprise a multi-band global navigation satellite system (GNSS) receiver configured to concurrently receive signals from a GPS satellite navigation system, a GLONASS satellite navigation system, a Galileo navigation system, and a BeiDou satellite navigation system.

The communication and positioning unit 118 can provide positioning data that can allow the edge device 102 to determine its own location at a centimeter-level accuracy. The communication and positioning unit 118 can also provide positioning data that can be used by the control unit 112 to determine a location 130 of the vehicle 122. For example, the control unit 112 can use positioning data concerning its own location to substitute for the location 130 of the vehicle 122. The control unit 112 can also use positioning data concerning its own location to estimate or approximate the location 130 of the vehicle 122.

The edge device 102 can also comprise a vehicle bus connector 120. The vehicle bus connector 120 can allow the edge device 102 to obtain certain data from the carrier vehicle 110 carrying the edge device 102. For example, the edge device 102 can obtain wheel odometry data from a wheel odometer of the carrier vehicle 110 via the vehicle bus connector 120. Also, for example, the edge device 102 can obtain a current speed of the carrier vehicle 110 via the vehicle bus connector 120. As a more specific example, the vehicle bus connector 120 can be a J1939 connector. The edge device 102 can take into account the wheel odometry data to determine the location 130 of the vehicle 122.

The edge device 102 can also record or generate at least a plurality of timestamps 132 marking the time when a vehicle 122 was detected at a location 130. For example, the localization and mapping engine 302 of the edge device 102 can mark the time using a global positioning system (GPS) timestamp, a Network Time Protocol (NTP) timestamp, a local timestamp based on a local clock run on the edge device 102, or a combination thereof. The edge device 102 can record the timestamps 132 from multiple sources to ensure that such timestamps 132 are synchronized with one another in order to maintain the accuracy of such timestamps 132.

As will be discussed in more detail in later sections, the edge device 102 can transmit data, information, videos, and other files to the server 104 in the form of an evidence package 136. The evidence package 136 can comprise the video frames 124.

In some embodiments, the evidence package 136 can comprise at least one license plate number 128 automatically recognized by the edge device 102 using the video frames 124 as inputs, a location 130 of the vehicle 122 determined by the edge device 102, the speed of the carrier vehicle 110 when the vehicle 122 was detected, any timestamps 132 recorded by the control unit 112, and vehicle attributes 134 of the vehicle 122 captured by the video frames 124.

In other embodiments, the evidence package 136 can comprise only the video frames 124 captured by the edge device 102 or the video frames 124 captured by the edge device 102 along with at least one of a location 130 of the vehicle 122 determined by the edge device 102, the speed of the carrier vehicle 110 when the vehicle 122 was detected, any timestamps 132 recorded by the control unit 112, and vehicle attributes 134 of the vehicle 122 captured by the video frames 124.

FIG. 1A also illustrates that the server 104 can transmit certain data and files to a third-party computing device/resource or client device 138. For example, the third-party computing device can be a server or computing resource of a third-party traffic violation processor. As a more specific example, the third-party computing device can be a server or computing resource of a government vehicle registration department. In other examples, the third-party computing device can be a server or computing resource of a subcontractor responsible for processing traffic violations for a municipality or other government entity.

The client device 138 can refer to a portable or non-portable computing device. For example, the client device 138 can refer to a desktop computer or a laptop computer. In other embodiments, the client device 138 can refer to a tablet computer or smartphone.

Figure 1B:
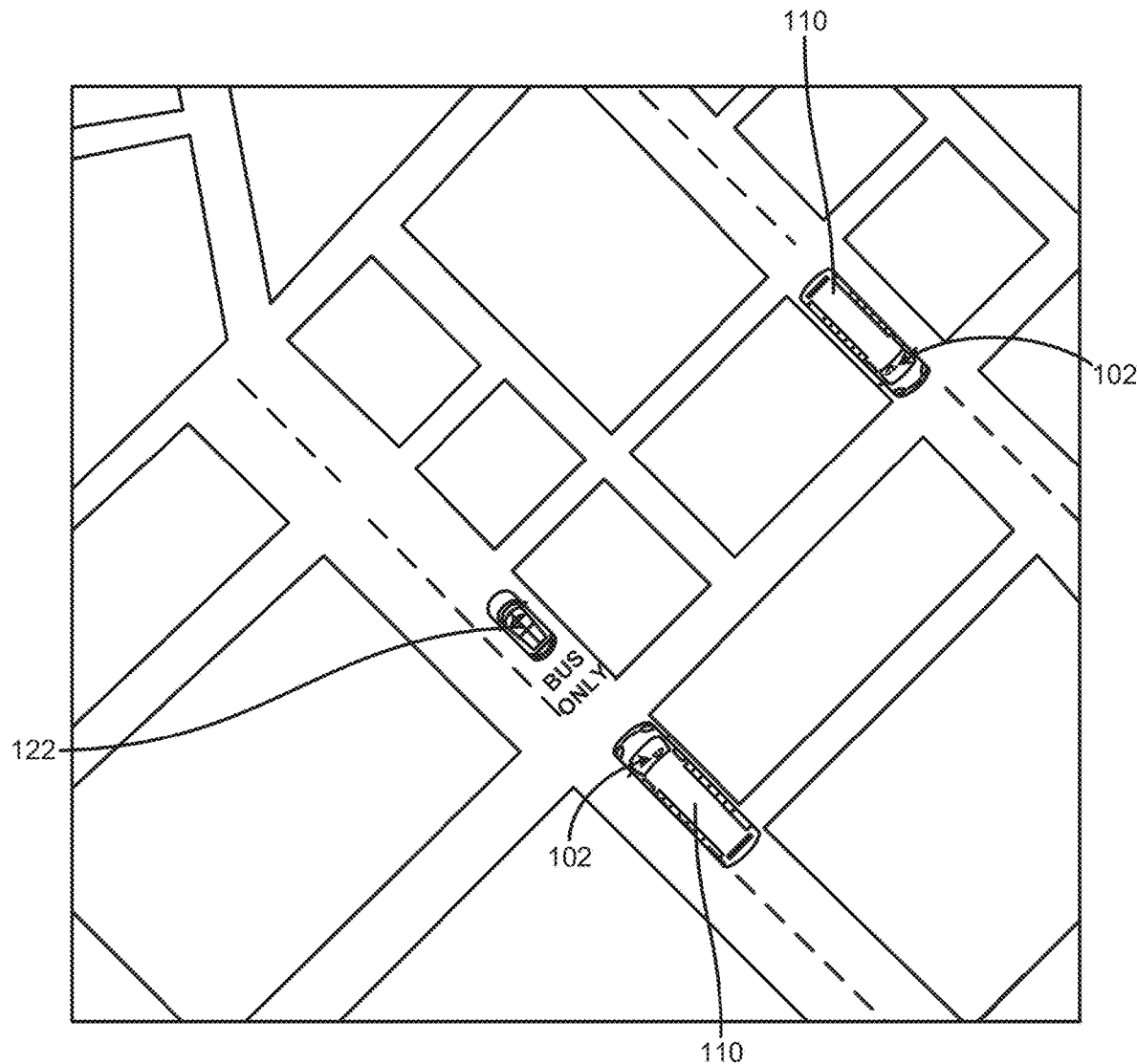
FIG. 1B illustrates an example scenario where the system can be utilized to automatically recognize license plates.

FIG. 1B illustrates an example scenario where the system 100 of FIG. 1A can be utilized to automatically recognize license plates 126. As shown in FIG. 1B, the vehicle 122 can be parked or in motion.

A carrier vehicle 110 (see also, FIG. 1C) having an edge device 102 (see also FIG. 1A) mounted or installed within the carrier vehicle 110 can drive by (i.e., next to) or behind the vehicle 122 parked, stopped, or driving in the vicinity of the carrier vehicle 110. For example, the carrier vehicle 110 can be driving in a lane or other roadway blocked by the vehicle 122. Alternatively, the carrier vehicle 110 can be driving in an adjacent roadway such as a lane next to the vehicle 11. The carrier vehicle 110 can encounter the vehicle 122 while traversing its daily route (e.g., bus route, garbage collection route, etc.).

The edge device 102 can capture videos of the vehicle 122 using the event camera 114, the LPR camera 116, or a combination thereof. The videos captured by the event camera 114, the LPR camera 116, or a combination thereof can be comprised of video frames 124. In one embodiment, the videos can be in the MPEG-4 Part 12 or MP4 file format. In some embodiments, the videos can refer to multiple videos captured by the event camera 114, the LPR camera 116, or a combination thereof. In other embodiments, the videos can refer to one compiled video comprising multiple videos captured by the event camera 114, the LPR camera 116, or a combination thereof.

In some embodiments, the control unit 112 of the edge device 102 can also determine a location 130 of the vehicle 122 using, in part, a positioning data obtained from the communication and positioning unit 118. The control unit 112 can also determine the location 130 of the vehicle 122 using, in part, inertial measurement data obtained from an IMU and wheel odometry data obtained from a wheel odometer of the carrier vehicle 110 via the vehicle bus connector 120.

One or more processors of the control unit 112 can also be programmed to automatically identify objects from the videos by applying a plurality of functions from a computer vision library to the videos to, among other things, read video frames 124 from the videos and pass at least some of the video frames 124 to a plurality of deep learning models (see, e.g., one or more neural networks) run on the control unit 112.

In certain embodiments, the one or more processors of the control unit 112 can also pass at least some of the video frames 124 to one or more deep learning models run on the control unit 112 to identify a set of vehicle attributes 134 of the vehicle 122. The set of vehicle attributes 134 can include a color of the vehicle 122, a make and model of the vehicle 122 and a vehicle type of the vehicle 122 (e.g., whether the vehicle 122 is a personal vehicle or a public service vehicle such as a fire truck, ambulance, parking enforcement vehicle, police car, etc.).

As a more specific example, the control unit 112 can pass the video frames 124 captured by the LPR camera 116 to a license plate recognition engine 304 run on the control unit 112 to recognize an alphanumeric string representing a license plate number 128 of the vehicle 122.

The control unit 112 of the edge device 102 can also wirelessly transmit an evidence package 136 comprising at least some of the video frames 124 to the server 104. In additional or alternative embodiments, the evidence package 136 can also comprise the recognized license plate number 128 of the vehicle 122, data or information concerning the location 130 of the vehicle 122, one or more timestamps 132, and the recognized vehicle attributes 134 to the server 104.

Each edge device 102 can be configured to continuously take videos of its surrounding environment (i.e., an environment outside of the carrier vehicle 110) as the carrier vehicle 110 traverses its usual carrier route. In these embodiments, the one or more processors of the control unit 112 of each edge device 102 can periodically transmit evidence packages 136 comprising video frames from such videos and data/information concerning the vehicles 122 captured in the videos to the server 104.

In some embodiments, the server 104 can confirm or validate the recognized license plate number(s) 128 received from the edge device(s) 102. In other embodiments, the server 104 can be the one that undertakes the automated license plate recognition to obtain the license plate number(s) 128.

Figure 1C:
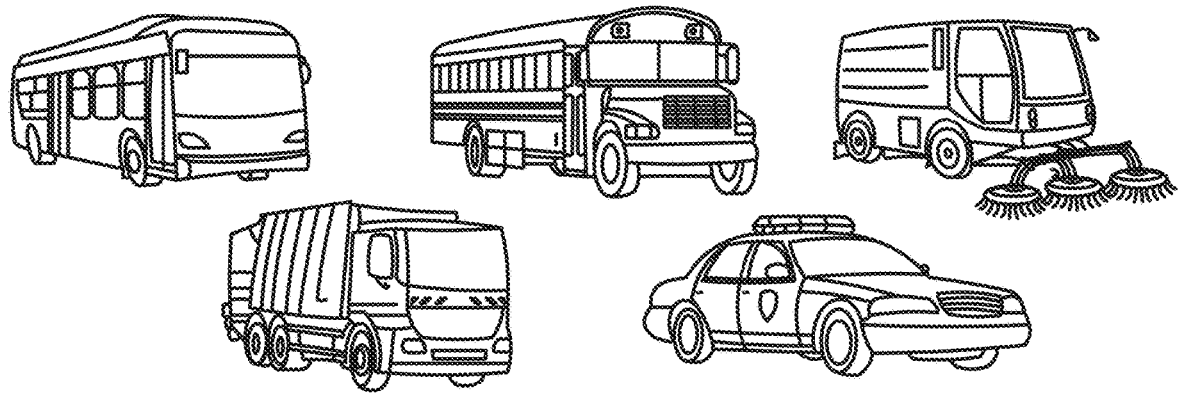
FIG. 1C illustrates different examples of carrier vehicles that can be used to carry the edge device.
Figure 1C:
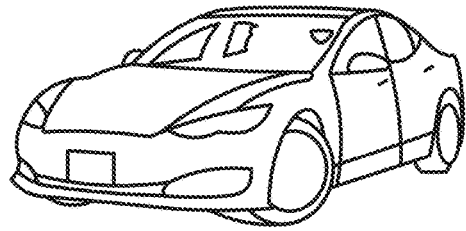
Figure 1C:
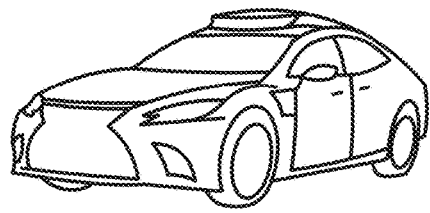

FIG. 1C illustrates that, in some embodiments, the carrier vehicle 110 can be a municipal fleet vehicle. For example, the carrier vehicle 110 can be a transit vehicle such as a municipal bus, train, or light-rail vehicle, a school bus, a street sweeper, a sanitation vehicle (e.g., a garbage truck or recycling truck), a traffic or parking enforcement vehicle, or a law enforcement vehicle (e.g., a police car or highway patrol car), a tram or light-rail train.

In other embodiments, the carrier vehicle 110 can be a semi-autonomous vehicle such as a vehicle operating in one or more self-driving modes with a human operator in the vehicle. In further embodiments, the carrier vehicle 110 can be an autonomous vehicle or self-driving vehicle.

In certain embodiments, the carrier vehicle 110 can be a private vehicle or vehicle not associated with a municipality or government entity.

In alternative embodiments, the edge device 102 can be carried by or otherwise coupled to a micro-mobility vehicle (e.g., an electric scooter). In other embodiments contemplated by this disclosure, the edge device 102 can be carried by or otherwise coupled to an unmanned aerial vehicle (UAV) or drone.

Figure 2A:
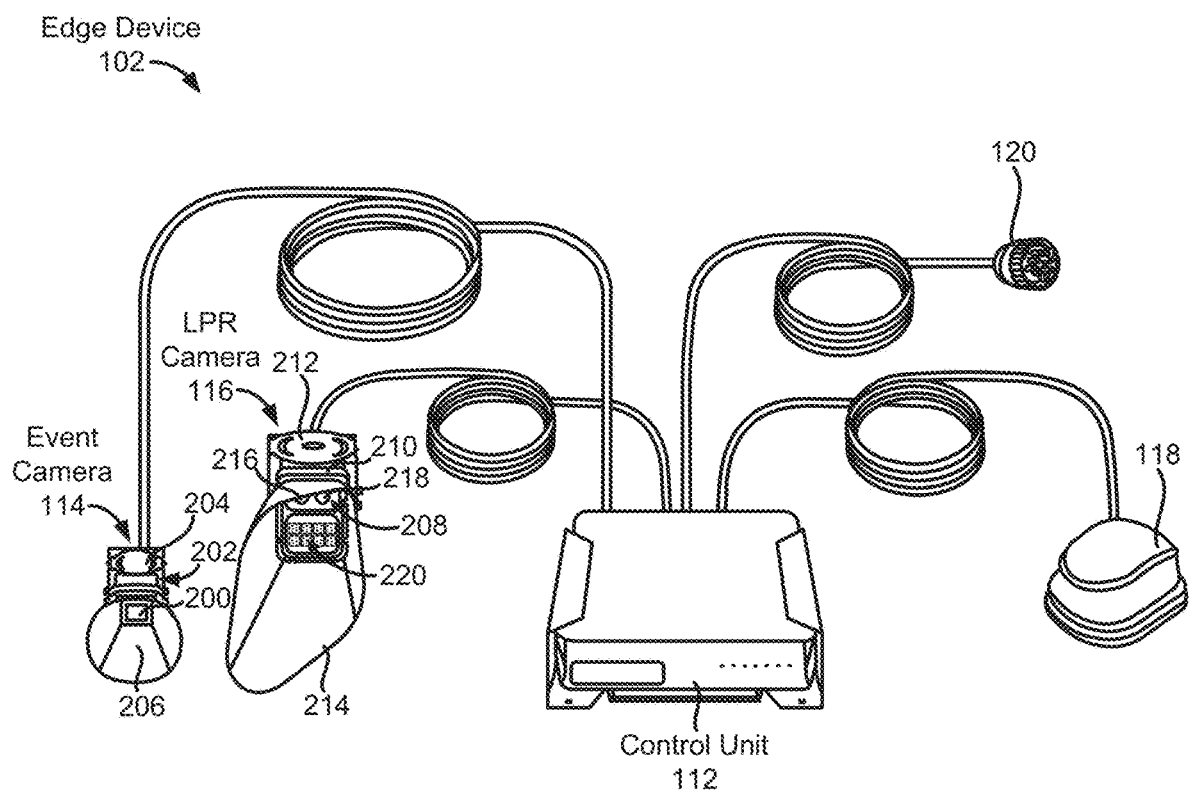
FIG. 2A illustrates one embodiment of an edge device of the system.

FIG. 2A illustrates one embodiment of an edge device 102 of the system 100. The edge device 102 can be any of the edge devices disclosed herein. For purposes of this disclosure, any references to the edge device 102 can also be interpreted as a reference to a specific component, processor, module, chip, or circuitry within the edge device 102. The edge device 102 can be configured for placement behind a windshield of a carrier vehicle 110 (e.g., a fleet vehicle, see FIG. 1C).

As shown in FIG. 2A, the edge device 102 can comprise a control unit 112, an event camera 114 communicatively coupled to the control unit 112, and one or more license plate recognition (LPR) camera cameras 116 communicatively coupled to the control unit 112. The edge device 102 can further comprise a communication and positioning unit 118 and a vehicle bus connector 120. The event camera 114 and the LPR camera 116 can be connected or communicatively coupled to the control unit 112 via high-speed camera interfaces such as a Mobile Industry Processor Interface (MIPI) camera serial interface.

The control unit 112 can comprise a plurality of processors, memory and storage units, and inertial measurement units (IMUs). The event camera 114 and the LPR camera 116 can be coupled to the control unit 112 via high-speed buses, communication cables or wires, and/or other types of wired or wireless interfaces. The components within each of the control unit 112, the event camera 114, or the LPR camera 116 can also be connected to one another via high-speed buses, communication cables or wires, and/or other types of wired or wireless interfaces.

The processors of the control unit 112 can include one or more central processing units (CPUs), graphical processing units (GPUs), Application-Specific Integrated Circuits (ASICs), field-programmable gate arrays (FPGAs), or a combination thereof. The processors can execute software stored in the memory and storage units to execute the methods or instructions described herein.

For example, the processors can refer to one or more GPUs and CPUs of a processor module configured to perform operations or undertake calculations. As a more specific example, the processors can perform operations or undertake calculations at a terascale. In some embodiments, the processors of the control unit 112 can be configured to perform operations at 21 teraflops (TFLOPS).

The processors of the control unit 112 can be configured to run multiple deep learning models or neural networks in parallel and process data received from the event camera 114, the LPR camera 116, or a combination thereof. More specifically, the processor module can be a Jetson Xavier NX™ module developed by NVIDIA Corporation. The processors can comprise at least one GPU having a plurality of processing cores (e.g., between 300 and 400 processing cores) and tensor cores, at least one CPU (e.g., at least one 64-bit CPU having multiple processing cores), and a deep learning accelerator (DLA) or other specially designed circuitry optimized for deep learning algorithms (e.g., an NVDLA™ engine developed by NVIDIA Corporation).

In some embodiments, at least part of the GPU's processing power can be utilized for object detection and/or license plate recognition. In these embodiments, at least part of the DLA's processing power can be utilized for object detection and/or lane line detection. Moreover, at least part of the CPU's processing power can be used for lane line detection and/or simultaneous localization and mapping. The CPU's processing power can also be used to run other functions and maintain the operation of the edge device 102.

The memory and storage units can comprise volatile memory and non-volatile memory or storage. For example, the memory and storage units can comprise flash memory or storage such as one or more solid-state drives, dynamic random access memory (DRAM) or synchronous dynamic random access memory (SDRAM) such as low-power double data rate (LPDDR) SDRAM, and embedded multimedia controller (eMMC) storage. For example, the memory and storage units can comprise a 512 gigabyte (GB) SSD, an 8 GB 128-bit LPDDR4× memory, and 16 GB eMMC 5.1 storage device. The memory and storage units can store software, firmware, data (including video and image data), tables, logs, databases, or a combination thereof.

Each of the IMUs can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs can be a low-power 6-axis IMU provided by Bosch Sensortec GmbH.

For purposes of this disclosure, any references to the edge device 102 can also be interpreted as a reference to a specific component, processor, module, chip, or circuitry within a component of the edge device 102.

The communication and positioning unit 118 can comprise at least one of a cellular communication module, a WiFi communication module, a Bluetooth® communication module, and a high-precision automotive-grade positioning unit.

For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The WiFi communication module can allow the control unit 112 to communicate over a WiFi network such as a WiFi network provided by a carrier vehicle 110, a municipality, a business, or a combination thereof. The WiFi communication module can allow the control unit 112 to communicate over one or more WiFi (IEEE 802.11) communication protocols such as the 802.11n, 802.11ac, or 802.11ax protocol.

The Bluetooth® module can allow the control unit 112 to communicate with other control units on other carrier vehicles over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules can comprise a combined WiFi and Bluetooth® module.

The communication and positioning unit 118 can comprise a multi-band global navigation satellite system (GNSS) receiver configured to concurrently receive signals from a GPS satellite navigation system, a GLONASS satellite navigation system, a Galileo navigation system, and a BeiDou satellite navigation system. For example, the communication and positioning unit 118 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the communication and positioning unit 118 can be configured to receive signals from all four of the aforementioned satellite navigation systems or three out of the four satellite navigation systems. For example, the communication and positioning unit 118 can comprise a ZED-F9K dead reckoning module provided by u-blox holding AG.

The communication and positioning unit 118 can provide positioning data that can allow the edge device 102 to determine its own location at a centimeter-level accuracy. The communication and positioning unit 118 can also provide positioning data that can be used by the control unit 112 of the edge device 102 to determine the location 130 of the vehicle 122 (see FIG. 1B). For example, the control unit 112 can use positioning data concerning its own location to substitute for the location 130 of the vehicle 122. The control unit 112 can also use positioning data concerning its own location to estimate or approximate the location 130 of the vehicle 122.

FIG. 2A also illustrates that the edge device 102 can comprise a vehicle bus connector 120 coupled to the control unit 112. The vehicle bus connector 120 can allow the control unit 112 to obtain wheel odometry data from a wheel odometer of a carrier vehicle 110 carrying the edge device 102. For example, the vehicle bus connector 120 can be a J1939 connector. The control unit 112 can take into account the wheel odometry data to determine the location of the vehicle 122.

The edge device 102 can also comprise a power management integrated circuit (PMIC). The PMIC can be used to manage power from a power source. In some embodiments, the components of the edge device 102 can be powered by a portable power source such as a battery. In other embodiments, one or more components of the edge device 102 can be powered via a physical connection (e.g., a power cord) to a power outlet or direct-current (DC) auxiliary power outlet (e.g., 12V/24V) of a carrier vehicle 110 carrying the edge device 102.

The event camera 114 can comprise an event camera image sensor 200 contained within an event camera housing 202, an event camera mount 204 coupled to the event camera housing 202, and an event camera skirt 206 coupled to and protruding outwardly from a front face or front side of the event camera housing 202.

The event camera housing 202 can be made of a metallic material (e.g., aluminum), a polymeric material, or a combination thereof. The event camera mount 204 can be coupled to the lateral sides of the event camera housing 202. The event camera mount 204 can comprise a mount rack or mount plate positioned vertically above the event camera housing 202. The mount rack or mount plate of the event camera mount 204 can allow the event camera 114 to be mounted or otherwise coupled to a ceiling and/or headliner of the carrier vehicle 110. The event camera mount 204 can allow the event camera housing 202 to be mounted in such a way that a camera lens of the event camera 114 faces the windshield of the carrier vehicle 110 or is positioned substantially parallel with the windshield. This can allow the event camera 114 to take videos of an environment outside of the carrier vehicle 110 including vehicles parked or in motion near the carrier vehicle 110. The event camera mount 204 can also allow an installer to adjust a pitch/tilt and/or swivel/yaw of the event camera housing 202 to account for a tilt or curvature of the windshield.

The event camera skirt 206 can block or reduce light emanating from an interior of the carrier vehicle 110 to prevent such light from interfering with the videos captured by the event camera image sensor 200. For example, when the carrier vehicle 110 is a municipal bus, the interior of the municipal bus is often lit by artificial lights (e.g., fluorescent lights, LED lights, etc.) to ensure passenger safety. The event camera skirt 206 can block or reduce the amount of artificial light that reaches the event camera image sensor 200 to prevent this light from degrading the videos captured by the event camera image sensor 200. The event camera skirt 206 can be designed to have a tapered or narrowed end and a wide flared end. The tapered end of the event camera skirt 206 can be coupled to a front portion or front face/side of the event camera housing 202. The event camera skirt 206 can also comprise a skirt distal edge defining the wide flared end. In some embodiments, the event camera 114 can be mounted or otherwise coupled in such a way that the skirt distal edge of the event camera skirt 206 is separated from the windshield of the carrier vehicle 110 by a separation distance. In some embodiments, the separation distance can be between about 1.0 cm and 10.0 cm.

In some embodiments, the event camera skirt 206 can be made of a dark-colored non-transparent polymeric material. In certain embodiments, the event camera skirt 206 can be made of a non-reflective material. As a more specific example, the event camera skirt 206 can be made of a dark-colored thermoplastic elastomer such as thermoplastic polyurethane (TPU).

The event camera image sensor 200 can be configured to capture video at a frame rate of between 15 frames per second and up to 60 frames per second (FPS). For example, the event camera image sensor 200 can be a high-dynamic range (HDR) image sensor. The event camera image sensor 200 can capture video images at a minimum resolution of 1920×1080 (or 2 megapixels). As a more specific example, the event camera image sensor 200 can comprise one or more CMOS image sensors provided by OMNIVISION Technologies, Inc.

As previously discussed, the event camera 114 can capture videos of an environment outside of the carrier vehicle 110, including any vehicles parked or in motion near the carrier vehicle 110, as the carrier vehicle 110 traverses its usual carrier route. The control unit 112 can be programmed to apply a plurality of functions from a computer vision library to the videos to read video frames 124 from the videos and pass the video frames 124 to a plurality of deep learning models (e.g., neural networks) run on the control unit 112.

As shown in FIG. 2A, the edge device 102 can also comprise an LPR camera 116. The LPR camera 116 can comprise at least two LPR image sensors 208 contained within an LPR camera housing 210, an LPR camera mount 212, coupled to the LPR camera housing 210, and an LPR camera skirt 214 coupled to and protruding outwardly from a front face or front side of the LPR camera housing 210.

The LPR camera housing 210 can be made of a metallic material (e.g., aluminum), a polymeric material, or a combination thereof. The LPR camera mount 212 can be coupled to the lateral sides of the LPR camera housing 210. The LPR camera mount 212 can comprise a mount rack or mount plate positioned vertically above the LPR camera housing 210. The mount rack or mount plate of the LPR camera mount 212 can allow the LPR camera 116 to be mounted or otherwise coupled to a ceiling and/or headliner of the carrier vehicle 110. The LPR camera mount 212 can also allow an installer to adjust a pitch/tilt and/or swivel/yaw of the LPR camera housing 210 to account for a tilt or curvature of the windshield.

The LPR camera mount 212 can allow the LPR camera housing 210 to be mounted in such a way that the LPR camera 116 faces the windshield of the carrier vehicle 110 at an angle. This can allow the LPR camera 116 to capture videos of license plates 126 of vehicles 122 directly in front of or on one side (e.g., a right side or left side) of the carrier vehicle 110.

The LPR camera 116 can comprise a daytime image sensor 216 and a nighttime image sensor 218. The daytime image sensor 216 can be configured to capture images or videos in the daytime or when sunlight is present. Moreover, the daytime image sensor 216 can be an image sensor configured to capture images or videos in the visible spectrum.

The nighttime image sensor 218 can be an infrared (IR) or near-infrared (NIR) image sensor configured to capture images or videos in low-light conditions or at nighttime.

In certain embodiments, the daytime image sensor 216 can comprise a CMOS image sensor manufactured or distributed by OmniVision Technologies, Inc. For example, the daytime image sensor 216 can be the OmniVision OV2311 CMOS image sensor configured to capture videos between 15 FPS and 60 FPS.

The nighttime image sensor 218 can comprise an IR or NIR image sensor manufactured or distributed by OmniVision Technologies, Inc.

In other embodiments not shown in the figures, the LPR camera 116 can comprise one image sensor with both daytime and nighttime capture capabilities. For example, the LPR camera 116 can comprise one RGB-IR image sensor.

The LPR camera can also comprise a plurality of IR or NIR light-emitting diodes (LEDs) 220 configured to emit IR or NIR light to illuminate an event scene in low-light or nighttime conditions. In some embodiments, the IR/NIR LEDs 220 can be arranged as an IR/NIR light array (see FIG. 2A).

The IR LEDs 220 can emit light in the infrared or near-infrared (NIR) range (e.g., about 800 nm to about 1400 nm) and act as an IR or NIR spotlight to illuminate a nighttime environment or low-light environment immediately outside of the carrier vehicle 110. In some embodiments, the IR LEDs 220 can be arranged as a circle or in a pattern surrounding or partially surrounding the nighttime image sensor 218. In other embodiments, the IR LEDs 220 can be arranged in a rectangular pattern, an oval pattern, and/or a triangular pattern around the nighttime image sensor 218.

In additional embodiments, the LPR camera 116 can comprise a nighttime image sensor 218 (e.g., an IR or NIR image sensor) positioned in between two IR LEDs 220. In these embodiments, one IR LED 220 can be positioned on one lateral side of the nighttime image sensor 218 and the other IR LED 220 can be positioned on the other lateral side of the nighttime image sensor 218.

In certain embodiments, the LPR camera 116 can comprise between 3 and 12 IR LEDS 220. In other embodiments, the LPR camera 116 can comprise between 12 and 20 IR LEDs.

In some embodiments, the IR LEDs 220 can be covered by an IR bandpass filter. The IR bandpass filter can allow only radiation in the IR range or NIR range (between about 780 nm to about 1500 nm) to pass while blocking light in the visible spectrum (between about 380 nm to about 700 nm). In some embodiments, the IR bandpass filter can be an optical-grade polymer-based filter or a piece of high-quality polished glass. For example, the IR bandpass filter can be made of an acrylic material (optical-grade acrylic) such as an infrared transmitting acrylic sheet. As a more specific example, the IR bandpass filter can be a piece of poly (methyl methacrylate) (PMMA) (e.g., Plexiglass™) that covers the IR LEDs 220.

In some embodiments, the LPR camera skirt 214 can be made of a dark-colored non-transparent polymeric material. In certain embodiments, the LPR camera skirt 214 can be made of a polymeric material. For example, the LPR camera skirt 214 can be made of a non-reflective material. As a more specific example, the LPR camera skirt 214 can be made of a dark-colored thermoplastic elastomer such as thermoplastic polyurethane (TPU).

Although FIG. 2A illustrates an embodiment of the LPR camera 116 with only one LPR camera skirt 214, it is contemplated by this disclosure that the LPR camera 116 can comprise an outer LPR camera skirt and an inner LPR camera skirt. The inner LPR camera skirt can block IR light reflected by the windshield of the carrier vehicle 110 that can interfere with the videos captured by the nighttime image sensor 218.

The LPR camera skirt 214 can comprise a first skirt lateral side, a second skirt lateral side, a skirt upper side, and a skirt lower side. The first skirt lateral side can have a first skirt lateral side length. The second skirt lateral side can have a second skirt lateral side length. In some embodiments, the first skirt lateral side length can be greater than the second skirt lateral side length such that the first skirt lateral side protrudes out further than the second skirt lateral side. In these and other embodiments, any of the first skirt lateral side length or the second skirt lateral side length can vary along a width of the first skirt lateral side or along a width of the second skirt lateral side, respectively. However, in all such embodiments, a maximum length or height of the first skirt lateral side is greater than a maximum length or height of the second skirt lateral side. In further embodiments, a minimum length or height of the first skirt lateral side is greater than a minimum length or height of the second skirt lateral side. The skirt upper side can have a skirt upper side length or a skirt upper side height. The skirt lower side can have a skirt lower side length or a skirt lower side height. In some embodiments, the skirt lower side length or skirt lower side height can be greater than the skirt upper side length or the skirt upper side height such that the skirt lower side protrudes out further than the skirt upper side. The unique design of the LPR camera skirt 214 can allow the LPR camera 116 to be positioned at an angle with respect to a windshield of the carrier vehicle 110 but still allow the LPR camera skirt 214 to block light emanating from an interior of the carrier vehicle 110 or block light from interfering with the image sensors of the LPR camera 116.

The LPR camera 116 can capture videos of license plates 126 of vehicles 122 parked or in motion near the carrier vehicle 110 as the carrier vehicle 110 traverses its usual carrier route. The control unit 112 can be programmed to apply a plurality of functions from a computer vision library to the videos to read the video frames 124 from the videos and pass the video frames 124 to a license plate recognition engine 304 run on the control unit 112 to automatically recognize the license plate number 128 from such video frames 124. For example, the control unit 112 can pass the video frames 124 to the license plate recognition engine 304 run on the control unit 112 to extract license plate numbers of all vehicles 122 detected by an object detection deep learning model run on the control unit 112.

The control unit 112 can generate an evidence package 136 comprising at least some of the video frames 124 and data/information concerning the vehicle 122 to the server 104. In some embodiments, the control unit 112 can include the recognized license plate number 128 of the vehicle 122 in the evidence package 136.

In other embodiments, the evidence package 136 can comprise the video frames 124 captured by the LPR camera 116. In these embodiments, the evidence package 136 containing the video frames 124 can be transmitted to the server 104 for the server 104 to recognize the license plate numbers 128 of vehicles 122 captured in the video frames 124.

Figure 2B:
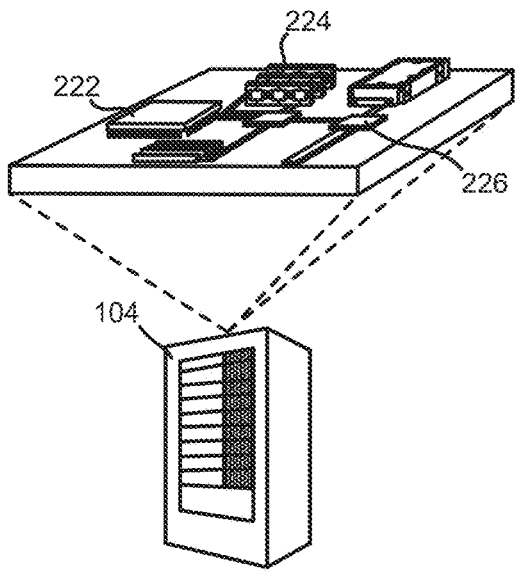
FIG. 2B illustrates one embodiment of a server of the system.

FIG. 2B illustrates one embodiment of the server 104 of the system 100. As previously discussed, the server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more physical servers or dedicated computing resources or nodes such as a rack-mounted server, a blade server, a mainframe, a dedicated desktop or laptop computer, one or more processors or processors cores therein, or a combination thereof.

For purposes of the present disclosure, any references to the server 104 can also be interpreted as a reference to a specific component, processor, module, chip, or circuitry within the server 104.

For example, the server 104 can comprise one or more server processors 222, server memory and storage units 224, and a server communication interface 226. The server processors 222 can be coupled to the server memory and storage units 224 and the server communication interface 226 through high-speed buses or interfaces.

The one or more server processors 222 can comprise one or more CPUs, GPUs, ASICS, FPGAs, or a combination thereof. The one or more server processors 222 can execute software stored in the server memory and storage units 224 to execute the methods or instructions described herein. The one or more server processors 222 can be embedded processors, processor cores, microprocessors, logic circuits, hardware FSMs, DSPs, or a combination thereof. As a more specific example, at least one of the server processors 222 can be a 64-bit processor.

The server memory and storage units 224 can store software, data (including video or image data), tables, logs, databases, or a combination thereof. The server memory and storage units 224 can comprise an internal memory and/or an external memory, such as a memory residing on a storage node or a storage server. The server memory and storage units 224 can be a volatile memory or a non-volatile memory. For example, the server memory and storage units 224 can comprise nonvolatile storage such as NVRAM, Flash memory, solid-state drives, hard disk drives, and volatile storage such as SRAM, DRAM, or SDRAM.

The server communication interface 226 can refer to one or more wired and/or wireless communication interfaces or modules. For example, the server communication interface 226 can be a network interface card. The server communication interface 226 can comprise or refer to at least one of a WiFi communication module, a cellular communication module (e.g., a 4G or 5G cellular communication module), and a Bluetooth®/BLE or other type of short-range communication module. The server 104 can connect to or communicatively couple with each of the edge devices 102 via the server communication interface 226. The server 104 can transmit or receive packets of data using the server communication interface 226.

Figure 2C:
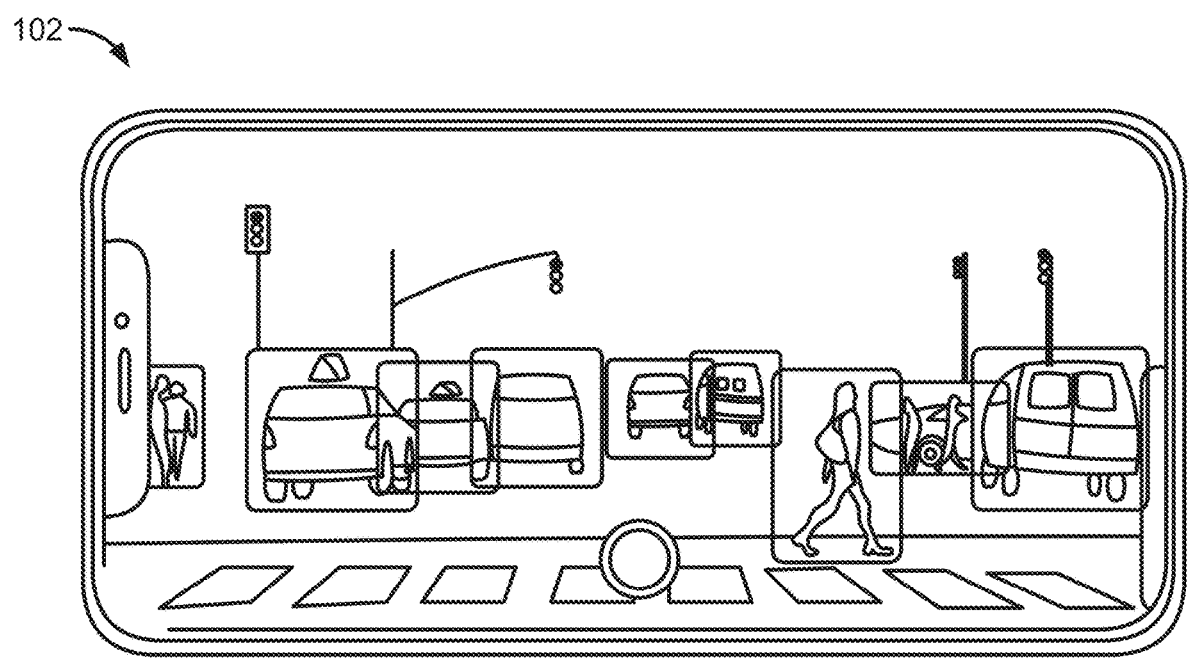
FIG. 2C illustrates another embodiment of the edge device as a personal communication device.

FIG. 2C illustrates an alternative embodiment of the edge device 102 where the edge device 102 is a personal communication device such as a smartphone or tablet computer. In this embodiment, the event camera 114 and the LPR camera 116 of the edge device 102 can be the built-in cameras or image sensors of the smartphone or tablet computer. Moreover, references to the one or more processors, the memory and storage units, the communication and positioning unit 118, and the IMUs of the edge device 102 can refer to the same or similar components within the smartphone or tablet computer.

Also, in this embodiment, the smartphone or tablet computer serving as the edge device 102 can also wirelessly communicate or be communicatively coupled to the server 104 via the secure connection 108. The smartphone or tablet computer can also be positioned near a windshield or window of a carrier vehicle 110 via a phone or tablet holder coupled to the ceiling/headliner, windshield, window, console, and/or dashboard of the carrier vehicle 110.

Figure 3:
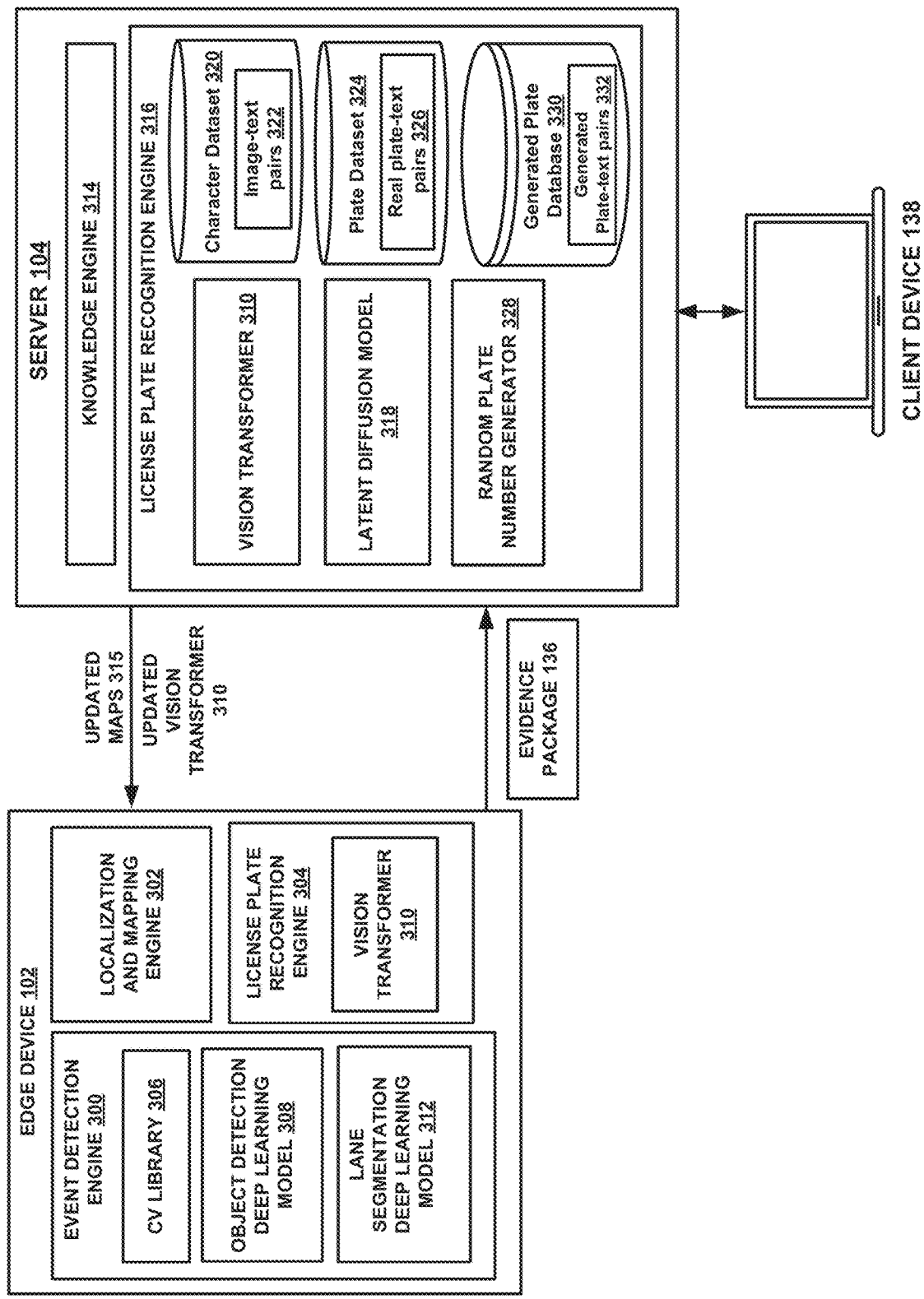
FIG. 3 illustrates various modules and engines of one embodiment of the edge device and the server.

FIG. 3 illustrates certain modules and engines of one embodiment of an edge device 102 and the server 104. Although FIG. 3 illustrates only one instance of the edge device 102, it is contemplated by this disclosure that the server 104 can be communicatively coupled to a plurality of edge devices 102.

Software instructions run on the edge device 102, including any of the engines and modules disclosed herein, can be written in the Java® programming language, C++ programming language, the Python® programming language, the Golang™ programming language, or a combination thereof.

In some embodiments, the edge device 102 can comprise at least an event detection engine 300, a localization and mapping engine 302, and a license plate recognition engine 304.

As previously discussed, the edge device 102 can continuously capture videos of an external environment surrounding the edge device 102. For example, the event camera 114 (see FIG. 2A) and the LPR camera 116 (see FIG. 2A) of the edge device 102 can capture everything that is within a field of view of the cameras.

In some embodiments, the event camera 114 and the LPR camera 116 can capture videos comprising a plurality of video frames 124. The edge device 102 can retrieve or grab the video frames 124 from a shared camera memory. The shared camera memory can be an onboard memory (e.g., non-volatile memory) of the edge device 102 for storing video frames captured by the event camera 114, the LPR camera 116, or a combination thereof. Since the event camera 114 and the LPR camera 116 are capturing videos at approximately 15 to 60 video frames per second (fps), the video frames are stored in the shared camera memory prior to being analyzed by the event detection engine 300. In some embodiments, the video frames can be grabbed using a video frame grab function such as the GStreamer tool.

The event detection engine 300 can call a plurality of functions from a computer vision library 306 to enhance one or more video frames by resizing, cropping, or rotating the one or more video frames. For example, the event detection engine 300 can crop and resize the one or more video frames to optimize the one or more video frames for analysis by one or more deep learning models, machine learning models, or convolutional neural networks run on the edge device 102.

For example, the event detection engine 300 can crop and resize the video frames in order to meet certain size parameters associated with one or more deep learning models or machine learning models run on the edge device 102. Also, for example, the event detection engine 300 can crop and resize the one or more video frames such that the aspect ratio of the one or more video frames meets parameters associated with the deep learning models or machine learning models run on the edge device 102.

In some embodiments, the computer vision library 306 can be the OpenCV® library maintained and operated by the Open Source Vision Foundation. In other embodiments, the computer vision library 306 can be or comprise functions from the TensorFlow® software library, the SimpleCV® library, or a combination thereof.

The event detection engine 300 can pass or feed at least some of the video frames 124 to an object detection deep learning model 308 (e.g., an object detection neural network) run on the edge device 102. By passing and feeding video frames to the object detection deep learning model 308, the event detection engine 300 of the edge device 102 can obtain as outputs from the object detection deep learning model 308 predictions and values concerning the objects shown in the video frames 124. For example, the event detection engine 300 can obtain, as outputs, an object class and a confidence score for each of the objects detected.

In some embodiments, the object detection deep learning model 308 can be configured or trained such that only certain vehicle-related objects are supported by the object detection deep learning model 308. For example, the object detection deep learning model 308 can be configured or trained such that the object classes supported only include cars, trucks, buses, etc. Also, for example, the object detection deep learning model 308 can be configured or trained such that the object classes supported also include bicycles, scooters, and other types of wheeled mobility vehicles. In some embodiments, the object detection deep learning model 308 can be configured or trained such that the object classes supported also comprise non-vehicle classes such as pedestrians, landmarks, street signs, commercial signs, billboards, fire hydrants, bus stops, and building façades.

In some embodiments, the object detection deep learning model 308 can be configured to detect more than 100 (e.g., between 100 and 200) objects per video frame. Although the object detection deep learning model 308 can be configured to accommodate numerous object classes, one advantage of limiting the number of object classes is to reduce the computational load on the processors of the edge device 102, shorten the training time of the neural network, and make the neural network more efficient.

The object detection deep learning model 308 can comprise a plurality of convolutional layers and connected layers trained for object detection (and, in particular, vehicle detection). In one embodiment, the object detection deep learning model 308 can be a convolutional neural network trained for object detection. For example, the object detection deep learning model 308 can be a variation of the Single Shot Detection (SSD) model with a MobileNet backbone as the feature extractor.

In other embodiments, the object detection deep learning model 308 can be the You Only Look Once Lite (YOLO Lite) object detection model.

In some embodiments, the object detection deep learning model 308 can also identify or predict certain attributes of the detected objects. For example, the object detection deep learning model 308 can identify or predict a set of attributes of an object identified as a vehicle (also referred to as vehicle attributes 134) such as the color of the vehicle, the make and model of the vehicle, and the vehicle type (e.g., whether the vehicle is a personal vehicle or a public service vehicle). The vehicle attributes 134 can be used by the event detection engine 300 to make an initial determination as to whether the vehicles 122 shown in the video frames 124 are subject to a municipality's traffic violation rules or policies.

The object detection deep learning model 308 can be trained, at least in part, from video frames of videos captured by the edge device 102 or other edge devices 102 deployed in the same municipality or coupled to other carrier vehicles 110 in the same carrier fleet. The object detection deep learning model 308 can be trained, at least in part, from video frames of videos captured by the edge device 102 or other edge devices at an earlier point in time. Moreover, the object detection deep learning model 308 can be trained, at least in part, from video frames from one or more open-sourced training sets or datasets.

In some embodiments, the edge device 102 can also comprise a license plate recognition engine 304. The license plate recognition engine 304 can comprise a text-adapted vision transformer 310 run on the edge device 102.

The vision transformer 310 can be trained to recognize license plate numbers 128 of vehicles 122 captured in the video frames 124 (see FIG. 1A). For example, the video frames 124 can show the license plate number 128 of the vehicle 122 from an overtaking angle (i.e., where the video frame or image shows the back license plate of the vehicle 122 as the vehicle 122 is driving away from a carrier vehicle 110) or an incoming angle (i.e., where the video frame or image shows the front license plate of the vehicle 122 as the vehicle 122 is driving toward the carrier vehicle 110).

As will be discussed in more detail in relation to FIG. 4, the license plate recognition engine 304 can divide an image or video frame 124 captured by the edge device 102 into a plurality image patches 400 (see FIG. 4). The image or video frame 124 can be divided or segmented horizontally and vertically to obtain the image patches 400. For example, the image or video frame 124 can be divided into a N×N (e.g., 16×16) grid of image patches 400. In some embodiments, the image or video frame 124 can be divided into a N×N grid of image patches 400 as part of a pre-processing step or operation. In other embodiments, the image or video frame 124 can be divided into a N×N grid of image patches 400 as an initial step or operation undertaken by the vision transformer 310.

The vision transformer 310 can then flatten the grid of image patches 400 into a 1×M dimensional vector, where M=N multiplied by N. For example, if N=16, the vision transformer 310 can flatten the 16×16 grid of image patches 400 into a 1×256 dimensional vector.

The vision transformer 310 can then determine a positional vector 404 (see FIG. 4) for each of the image patches 400. The positional vector 404 can represent a spatial position of each of the image patches 400 in the image or video frame 124.

The vision transformer 310 can then add the learned position vector 404 to each of the image patches 400 and input the image patches 400 and their associated positional vectors 404 to a transformer encoder 406 (see FIG. 4) of the vision transformer 310.

The license plate recognition engine 304 can then obtain a prediction, outputted by the vision transformer 310, concerning the license plate number 128 of the license plate 126. The prediction can be in the form of an alphanumeric string representing the predicted license plate number 128.

If multiple vehicles 122 and multiple license plates 126 are detected in one image or video frame 124, the license plate recognition engine 304 can repeat the recognition process for cropped versions of the image or video frame 124 showing only one license plate 126.

In some embodiments, the text-adapted vision transformer 310 can be run on the edge device 102 (e.g., run on the control unit 112 of the edge device 102) while the edge device 102 is coupled to a carrier vehicle 110 in motion or stopped. In these embodiments, the images or video frames 124 fed to the license plate recognition engine 304 can be captured by the LPR camera 116 (or the event camera 114) of the edge device 102 while the carrier vehicle 110 is in motion or stopped.

In some embodiments, the server 104 can also have an instance of the vision transformer 310 run on the server 104. The vision transformer 310 run on the server 104 can double-check the license plate recognition undertaken by the edge device 102 by feeding or passing at least some of the same video frames 124 to the vision transformer 310. Additionally or alternatively, the images or video frames 124 captured by the edge devices 102 can be transmitted to the server 104 (e.g., via evidence packages 136) and the vision transformer 310 run on the server 104 can undertake the automated license plate recognition procedure.

The edge device 102 can also comprise a localization and mapping engine 302. The localization and mapping engine 302 can calculate or otherwise estimate the location 130 of the vehicle 122 based in part on the present location of the edge device 102 obtained from at least one of the communication and positioning unit 118 (see, e.g., FIG. 2A) of the edge device 102, inertial measurement data obtained from the IMUs of the edge device 102, and wheel odometry data obtained from the wheel odometer of the carrier vehicle 110 carrying the edge device 102. For example, the localization and mapping engine 302 can use the present location of the edge device 102 to represent the location 130 of the vehicle 122.

In other embodiments, the localization and mapping engine 302 can estimate the location 130 of the vehicle 122 by calculating a distance separating the vehicle 122 from the edge device 102 and adding such a separation distance to its own present location. As a more specific example, the localization and mapping engine 302 can calculate the distance separating the vehicle 122 from the edge device 102 using video frames containing the license plate of the vehicle 122 and a computer vision algorithm (e.g., an image depth analysis algorithm) designed for distance calculation. In additional embodiments, the localization and mapping engine 302 can determine the location 130 of the vehicle 122 by recognizing an object or landmark (e.g., a bus stop sign) with a known geolocation associated with the object or landmark near the vehicle 122.

The edge device 102 can also record or generate at least a plurality of timestamps 132 marking the time when the vehicle 122 was detected at the location 130. For example, the localization and mapping engine 302 can mark the time using a global positioning system (GPS) timestamp, a Network Time Protocol (NTP) timestamp, a local timestamp based on a local clock run on the edge device 102, or a combination thereof. The edge device 102 can record the timestamps 132 from multiple sources to ensure that such timestamps 132 are synchronized with one another in order to maintain the accuracy of such timestamps 132.

In some embodiments, the event detection engine 300 can also pass the video frames 124 to a lane segmentation deep learning model 312 run on the edge device 102. By passing and feeding video frames 124 to the lane segmentation deep learning model 312, the event detection engine 300 can detect one or more lanes of roadway(s) shown in the video frames.

For example, the lane segmentation deep learning model 312 can bound the lanes shown in the video frames in polygons. The lane segmentation deep learning model 312 can also output image coordinates associated with the polygons bounding such lanes.

In some embodiments, the lane segmentation deep learning model 312 run on the edge device 102 can be a neural network or convolutional neural network trained for lane detection and segmentation. For example, the lane segmentation deep learning model 312 can be a multi-headed convolutional neural network comprising a residual neural network (e.g., a ResNet such as a ResNet34) backbone with a standard mask prediction decoder.

In certain embodiments, the lane segmentation deep learning model 312 can be trained using a dataset designed specifically for lane detection and segmentation. In other embodiments, the lane segmentation deep learning model 312 can also be trained using video frames obtained from other deployed edge devices 102. Moreover, the lane segmentation deep learning model 312 can also be trained to detect lane markings. For example, the lane markings can comprise lane lines, text markings, markings indicating a crosswalk, markings indicating turn lanes, dividing line markings, or a combination thereof.

FIG. 3 also illustrates that the server 104 can comprise at least a knowledge engine 314 and a license plate recognition engine 316. The license plate recognition engine 316 run on the server 104 can be a more robust version of the license plate recognition engine 304 run on the edge device 102.

Software instructions run on the server 104, including any of the engines and modules disclosed herein and depicted in FIG. 3, can be written in the Ruby® programming language (e.g., using the Ruby on Rails® web application framework), Python® programming language, or a combination thereof.

The knowledge engine 314 can be configured to construct a virtual 3D environment representing the real-world environment captured by the cameras of the edge devices 102. The knowledge engine 314 can be configured to construct three-dimensional (3D) semantic annotated maps from videos and data received from the edge devices 102. The knowledge engine 314 can continuously update such maps based on new videos or data received from the edge devices 102. For example, the knowledge engine 314 can use inverse perspective mapping to construct the 3D semantic annotated maps from two-dimensional (2D) video image data obtained from the edge devices 102.

The semantic annotated maps can be built on top of existing standard definition maps and can be built on top of geometric maps constructed from sensor data and salient points obtained from the edge devices 102. For example, the sensor data can comprise positioning data from the communication and positioning units 118 and IMUs of the edge devices 102 and wheel odometry data from the carrier vehicles 110.

The geometric maps can be stored in the knowledge engine 314 along with the semantic annotated maps. The knowledge engine 314 can also obtain data or information from one or more government mapping databases or government GIS maps to construct or further fine-tune the semantic annotated maps. In this manner, the semantic annotated maps can be a fusion of mapping data and semantic labels obtained from multiple sources including, but not limited to, the plurality of edge devices 102, municipal mapping databases, or other government mapping databases, and third-party private mapping databases. The semantic annotated maps can be set apart from traditional standard definition maps or government GIS maps in that the semantic annotated maps are: (i) three-dimensional, (ii) accurate to within a few centimeters rather than a few meters, and (iii) annotated with semantic and geolocation information concerning objects within the maps. For example, objects such as lane lines, lane dividers, crosswalks, traffic lights, no parking signs or other types of street signs, fire hydrants, parking meters, curbs, trees or other types of plants, or a combination thereof are identified in the semantic annotated maps and their geolocations and any rules or regulations concerning such objects are also stored as part of the semantic annotated maps. As a more specific example, all bus lanes or bike lanes within a municipality and their hours of operation/occupancy can be stored as part of a semantic annotated map of the municipality.

The semantic annotated maps can be updated periodically or continuously as the server 104 receives new mapping data, positioning data, and/or semantic labels from the various edge devices 102. For example, a bus serving as a carrier vehicle 110 having an edge device 102 installed within the bus can drive along the same bus route multiple times a day. Each time the bus travels down a specific roadway or passes by a specific landmark (e.g., building or street sign), the edge device 102 on the bus can take video(s) of the environment surrounding the roadway or landmark. The videos can first be processed locally on the edge device 102 (using the computer vision tools and deep learning models previously discussed) and the outputs from such detection can be transmitted to the knowledge engine 314 and compared against data already included as part of the semantic annotated maps. If such labels and data match or substantially match what is already included as part of the semantic annotated maps, the detection of this roadway or landmark can be corroborated and remain unchanged. If, however, the labels and data do not match what is already included as part of the semantic annotated maps, the roadway or landmark can be updated or replaced in the semantic annotated maps. An update or replacement can be undertaken if a confidence level or confidence score of the new objects detected is higher than the confidence level or confidence score of objects previously detected by the same edge device 102 or another edge device 102. This map updating procedure or maintenance procedure can be repeated as the server 104 receives more data or information from additional edge devices 102.

As shown in FIG. 3, the server 104 can transmit or deploy revised or updated semantic annotated maps 315 to the edge devices 102. For example, the server 104 can transmit or deploy revised or updated semantic annotated maps 315 periodically or when an update has been made to the existing semantic annotated maps.

The license plate recognition engine 316 can comprise an instance of the vision transformer 310, a latent diffusion model 318, a character dataset 320 comprising a plurality of image-text pairs 322, a plate dataset 324 comprising a plurality of real plate-text pairs 326, a random plate number generator 328, and a generate plate database 330 comprising a plurality of generated plate-text pairs 332.

As previously discussed, the vision transformer 310 run on the server 104 can be a more robust version of the vision transformer 310 run on the edge device 102. The vision transformer 310 run on the server 104 can double-check the license plate recognition undertaken by the edge device 102 by feeding or passing at least some of the same video frames 124 to the vision transformer 310 run on the server 104.

Additionally, or alternatively, the images or video frames 124 captured by the edge devices 102 can be transmitted to the server 104 (e.g., via evidence packages 136) and the vision transformer 310 run on the server 104 can undertake the automated license plate recognition procedure entirely on the server 104.

As will be discussed in more detail with respect to FIG. 4, the license plate recognition engine 316 can divide an image or video frame 124 (e.g., captured by one of the edge devices 102) into a plurality image patches 400 (see FIG. 4). The image or video frame 124 can be divided or segmented horizontally and vertically to obtain the image patches 400. For example, the image or video frame 124 can be divided into a N×N (e.g., 16×16) grid of image patches 400.

The vision transformer 310 run on the server 104 can then flatten the grid of image patches 400 into a 1×M dimensional vector, where M=N multiplied by N. For example, if N=16, the vision transformer 310 can flatten the 16×16 grid of image patches 400 into a 1×256 dimensional vector.

The vision transformer 310 can then determine a positional vector 404 (see FIG. 4) for each of the image patches 400. The positional vector can represent a spatial position of each of the image patches 400 in the image or video frame 124.

The vision transformer 310 can then add the position vector 404 to each of the image patches 400 and input the image patches 400 and their associated positional vectors 404 to a transformer encoder 406 (see FIG. 4) of the vision transformer 310.

The license plate recognition engine 316 can then obtain a prediction, outputted by the vision transformer 310, concerning the license plate number 128 of the license plate 126. The prediction can be in the form of an alphanumeric string representing the predicted license plate number 128.

As will be discussed in more detail in relation to FIG. 5A, the vision transformer 310 can be pre-trained on a plurality of image-text pairs 322. The image-text pairs 322 can be stored as part of a character dataset 320. The image-text pairs 322 can comprise images or video frames of real-life objects comprising text and annotations of the text. The image-text pairs 322 can be made up of millions of samples of in-the-wild images of real-life objects containing numbers and/or English-language words/characters. For example, the in-the-wild images can comprise images or video frames of street signs, traffic signs, commercial signs, billboards, building signage, newspapers, pages from books, and pages from the dictionary, receipts, and other printed documents.

The vision transformer 310 can also be trained on a plate dataset 324 comprising a plurality of real plate-text pairs 326. The real plate-text pairs 326 can comprise images or video frames 124 of real-life license plates and an annotated license plate number associated with each of the real-life license plates.

The plate dataset 324 can comprise a diverse collection of real-life license plates and images of such license plates of varying levels of noise, blur, and/or exposure. For example, the real-life license plates in the plate dataset 324 can comprise license plates with differing U.S. state plate aesthetics or configurations (e.g., license plates from different U.S. states and differing plate aesthetics or configurations from each of these U.S. states), license plates with differing non-U.S. country or region plate aesthetics or configurations (e.g., license plates from different non-U.S. countries or regions and differing plate aesthetics or configurations from each of these non-U.S. countries or regions), license plates with differing plate character configurations or styles (e.g., stacked plates, non-stacked plates, exempt plates, government or municipal plates, medical-related plates, diplomatic plates, etc.), license plates with differing levels of noise, license plates with differing levels of blur associated with the images or video frames, license plates with differing levels of exposure associated with the images or video frames, license plates with differing levels of occlusion associated with the license plate image, license plates with differing levels of corrosion, and license plates with differing levels of paint loss.

As will be discussed in more detail in relation to FIGS. 5A and 7, the vision transformer 310 can be further trained on artificially-generated plate-text pairs 332. The artificially-generated plate-text pairs 332 can comprise images of non-real license plates artificially generated by the latent diffusion model 318 run on the server 104 and a non-real license plate number associated with each of the non-real license plates.

Each of the non-real license plate numbers can be generated by the random plate number generator 328 run on the server 104. The artificially-generated images of the non-real license plates can be generated by the latent diffusion model 318 based on the non-real license plate number generated by the random plate number generator 328 and one or more low-accuracy plate features 505 (see FIG. 5A). For example, the latent diffusion model 318 can be prompted to generate an image of a non-real license plate based in part on a non-real license plate number and one or more plate features that resulted in at least one erroneous or inaccurate license plate recognition/prediction made by the vision transformer 310 in the past.

In some embodiments, the random plate number generator 328 can generate the non-real license plate number based on restrictions or constraints associated with the low-accuracy plate features 505.

The low-accuracy plate features 505 can be selected or changed based on the accuracy of predictions/recognitions made by the vision transformer 310. The latent diffusion model 318 and the random plate number generator 328 will be discussed in more detail in relation to FIGS. 5A and 7.

The artificially-generated plate-text pairs 332 can be stored as part of a generated plate database 330 on the server 104 or accessible to the server 104. Although FIG. 3 illustrates the generated plate database 330 as separate from the plate dataset 324, it is contemplated by this disclosure that the generated plate-text pairs 332 can also be stored as part of the plate dataset 324.

In some embodiments, the vision transformer 310 can be continuously trained on new artificially-generated plate-text pairs 332. For example, the vision transformer 310 can be initially trained on the plate dataset 324 comprising real plate-text pairs 326 and this training data can be iteratively expanded and updated by including artificially-generated plate-text pairs 332 comprising images of non-real license plates generated by the latent diffusion model 318. The latent diffusion model 318 can receive as inputs low-accuracy plate features that previously caused the vision transformer 310 to perform poorly. When the vision transformer 310 is continuously trained in this way, the model becomes automatically adaptable to unseen license plate configurations.

In some embodiments, the server 104 can periodically or continuously transmit updated or newly trained iterations of the vision transformer 310 to each of the edge devices 102 after each training session or training epoch.

Figure 4:
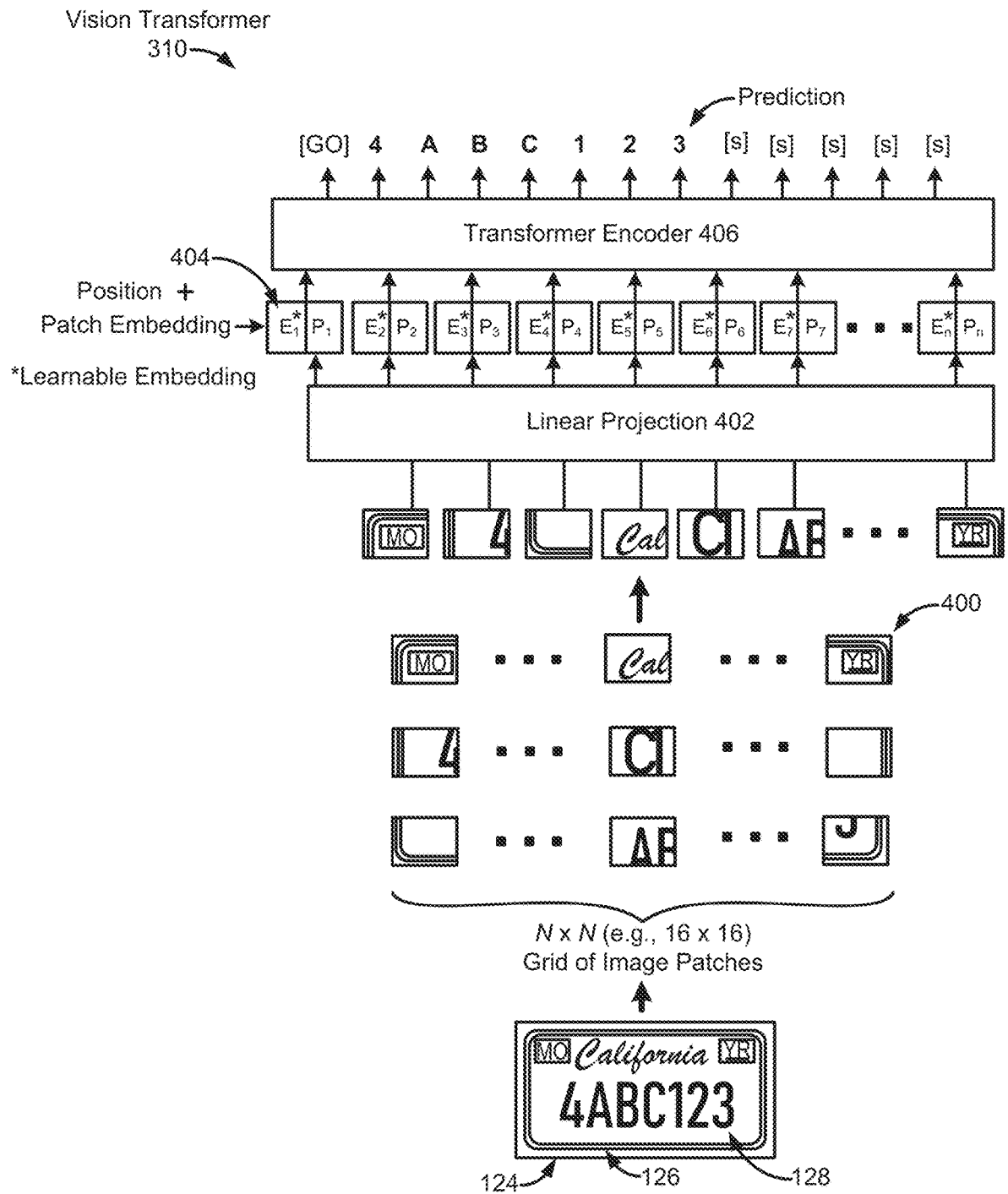
FIG. 4 is a schematic diagram illustrating one embodiment of a text-adapted vision transformer in operation.

FIG. 4 is a schematic diagram illustrating one embodiment of a text-adapted vision transformer 310 in operation. The text-adapted vision transformer 310 can be an image classification model that employs a transformer architecture to analyze patches of an image. The text-adapted vision transformer 310 can be trained to produce a prediction concerning a license plate number 128 of a license plate 126 contained in a video frame 124 or image captured by one of the edge devices 102.

As previously discussed, the text-adapted vision transformer 310 can be run on each of the edge devices 102. In some embodiments, the video frames 124 or images captured by an edge device 102 can be fed to the text-adapted vision transformer 310 run on that edge device 102. In some embodiments, the video frames 124 or images can be captured by the edge device 102 while the carrier vehicle 110 carrying the edge device 102 is in motion.

Additionally, or alternatively, the text-adapted vision transformer 310 can be run on the server 104. In these embodiments, the text-adapted vision transformer 310 can be used to confirm or validate a license plate number 128 recognized by one of the edge devices 102.

As shown in FIG. 4, a video frame 124 or image containing the license plate 126 can first be re-sized to 224×224 pixels. The video frame 124 or image can then be divided, horizontally and vertically, into a plurality of image patches 400. At least one of the image patches 400 can comprise a portion of or part of one of the characters making up the license plate number 128 of the license plate 126.

In some embodiments, the video frame 124 or image can be divided horizontally and vertically into a N×N grid of image patches 400. In certain embodiments, N can be an integer between 4 and 256 (or between 8 and 64, or, more specifically, between 12 and 32). For example, the N×N grid of image patches 400 can be a 16×16 grid of image patches 400.

The N×N grid of image patches 400 can then be provided to a linear projection layer 402 of the text-adapted vision transformer 310. The linear projection layer 402 can be configured to flatten each image patch in the N×N grid of image patches to 1×((H/N)×(W/N)).

In these embodiments, the resulting input to the transformer encoder can be M×1×((H/N)×(W/N)), where H is a height of the image or video frame in pixels, where W is a width of the image or video frame in pixels, and where M is equaled to N multiplied by N.

In some embodiments, the image or video frame can be cropped and re-sized to 224×224 pixels.

The vision transformer 310 can also determine or learn a positional vector 404 (e.g., a two-dimensional vector) for each of the image patches 400. The positional vector 404 can represent a spatial position of each of the image patches 400 in the video frame 124 or image.

The positional vector 404 can be added to each of the image patches 400 before inputting the image patches 400 to a transformer encoder 406 of the vision transformer 310. The text-adapted vision transformer 310 learns to interpret the addition of the vector as having a certain position.

The image patches 400 and their associated positional vectors 404 can then be provided as inputs to a transformer encoder 406 of the text-based vision transformer 310. The transformer encoder 406 can separately predict each character of the license plate number 128.

As shown in FIG. 4, a start-token ("[GO]") can signify the beginning of the prediction and padding-tokens ("[s]") can represent the end of the prediction.

The transformer encoder 406 can comprise a series of identical blocks of operations. The first step in each block can be a multi-head self-attention mechanism (MHA). Each head of this operation can generate three vectors for each patch: the query (Q), key (K), and value (V) vectors. These can be used to query all other patches and create a new representation which considers the information in the other patches. This operation can be expressed formally as: softmax $(QK/\sqrt{d})V$ where "d" is the length of the vectors. The result of each head is combined along with a recurrent connection (see, for example, He, Kaiming, et al. "Deep residual learning for image recognition." *Proceedings of the IEEE conference on computer vision and pattern recognition.* 2016 for more information) from the input to the MHA and a layer normalization is applied to this combined value (see, for example, Ba, Jimmy Lei, Jamie Ryan Kiros, and Geoffrey E. Hinton. "Layer normalization." arXiv preprint arXiv: 1607.06450 (2016)). The MHA result can then be passed through a simple feed-forward network. The result of which can be combined with a recurrent connection from the MHA output and another layer normalization can be applied.

One technical problem faced by the applicant is how to accurately recognize license plates containing stacked characters or license plates comprising characters of different sizes (that may also be stacked). For example, most traditional image classification models rely on chunking an image or video frame by intervals along the x-axis. This approach is ill-suited to license plates with stacked characters or characters arranged vertically. Moreover, this approach also typically requires an extra orientation correction pre-processing step that aligns the characters parallel to the x-axis before inputting the characters to the algorithm. One technical solution discovered and developed by the applicant is the text-based vision transformer disclosed herein that does not contain an inherent bias toward horizontally-oriented characters and, instead, treats all characters the same, regardless of the orientation or arrangement of the characters.

Figure 5A:
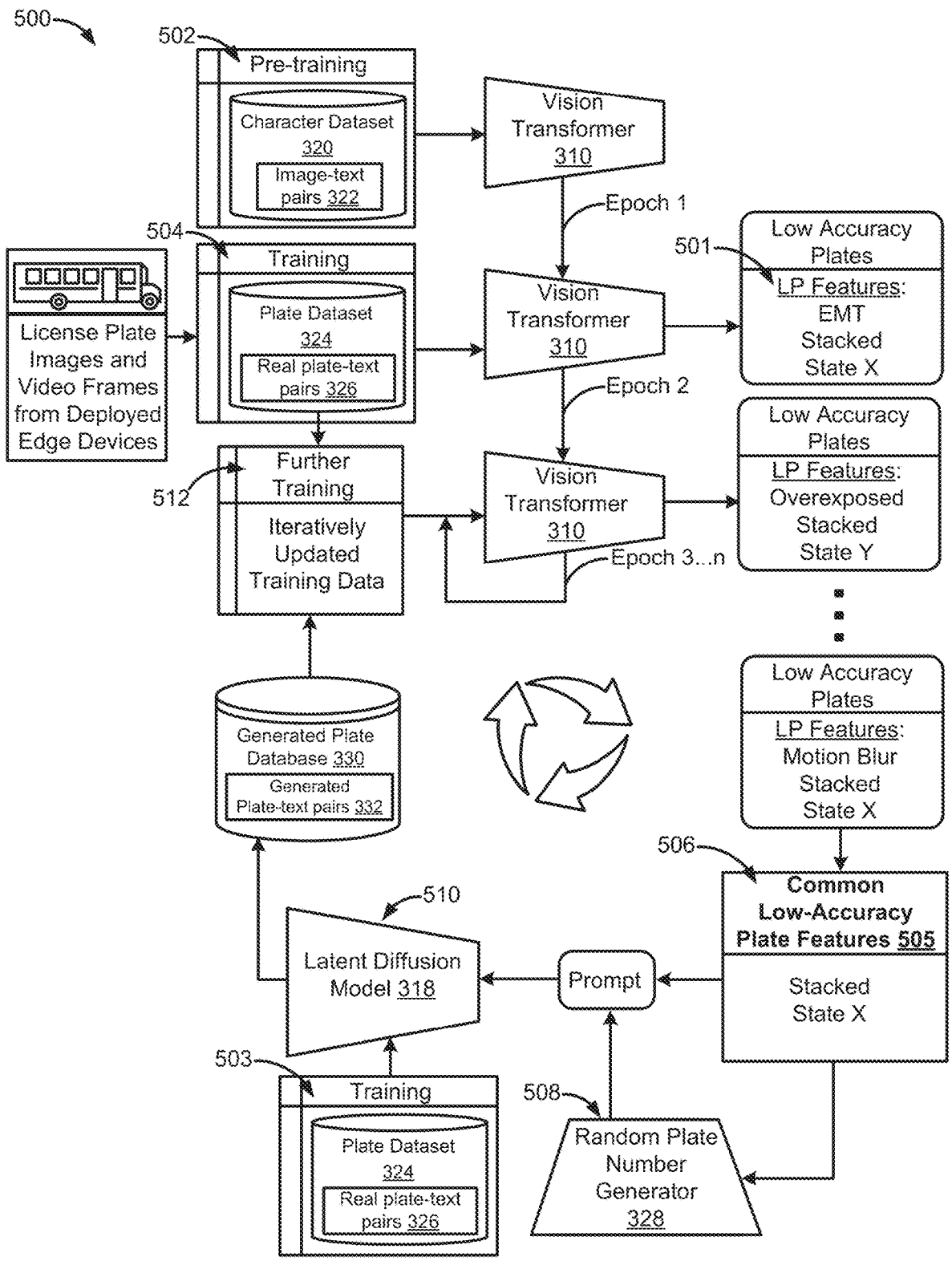
FIG. 5A is a schematic flow diagram illustrating a machine-based method of training the vision transformer to undertake automated license plate recognition.

FIG. 5A is a schematic flow diagram illustrating a machine-based method 500 of training the vision transformer 310 to undertake automated license plate recognition. The method 500 can be undertaken by the edge device(s) 102 and server 104 (shown in FIGS. 1A and 3) with the video frames and images captured by the edge device(s) 102.

The method 500 can comprise pre-training or initially training the text-adapted vision transformer 310 on a plurality of image-text pairs 322 in operation 502. In some embodiments, millions of image-text pairs 322 can be provided as inputs to the vision transformer 310 to train the vision transformer 310.

The image-text pairs 322 can comprise images or video frames of real-life objects comprising text and an annotation of the text shown in the images or video frames. The image-text pairs 322 can be stored as part of a character dataset 320.

In some embodiments, the character dataset 320 can be stored in one or more databases 107 in the cloud computing environment 106. In other embodiments, the character dataset 320 can be stored on the server 104 or on the edge device(s) 102.

The image-text pairs 322 can be made up of millions of samples of in-the-wild images of real-life objects containing numbers and/or English-language words/characters. For example, the in-the-wild images can comprise images or video frames of street signs, traffic signs, commercial signs, billboards, building signage, newspapers, pages from books, and pages from the dictionary, receipts, and other printed documents. It is important that the character dataset 320 be as diverse as possible and drawn from disparate sources.

In some embodiments, the image-text pairs 322 can comprise images or video frames of street signs, traffic signs, commercial signs, billboards, and building signage captured by the edge devices 102 as the carrier vehicles 110 carrying such edge devices 102 traverse their daily routes or go about their usual business.

Additionally or alternatively, the image-text pairs 322 can be made up of samples of in-the-wild images of real-life objects containing non-English-language words/characters.

In certain embodiments, the image-text pairs 322 used to pre-train the vision transformer 310 can be obtained, in part, from a third-party service or database.

The method 500 can also comprise training the text-adapted vision transformer 310 on a plate dataset 324 comprising a plurality of real plate-text pairs 326 in operation 504. The real plate-text pairs 326 can comprise images or video frames of real-life license plates and an annotated license plate number associated with each of the real-life license plates.

In some embodiments, the real plate-text pairs 326 can comprise images or video frames of real-life license plates captured by deployed edge devices 102 as the carrier vehicles 110 carrying such edge devices 102 traverse their daily routes or go about their usual business.

Figure 6A:
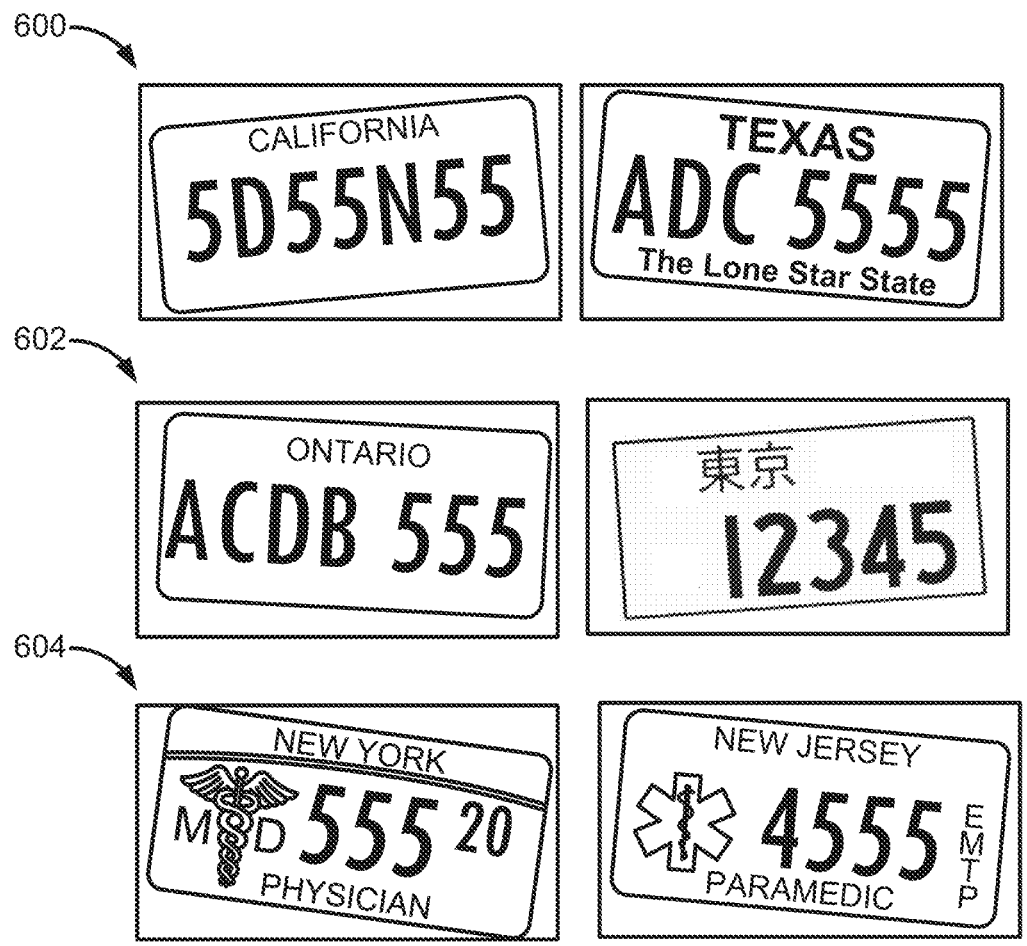
FIG. 6A illustrates example license plates with differing U.S. state plate aesthetics or configurations, differing non-U.S. country or region plate aesthetics or configurations, and differing plate character configurations or styles.
Figure 6B:
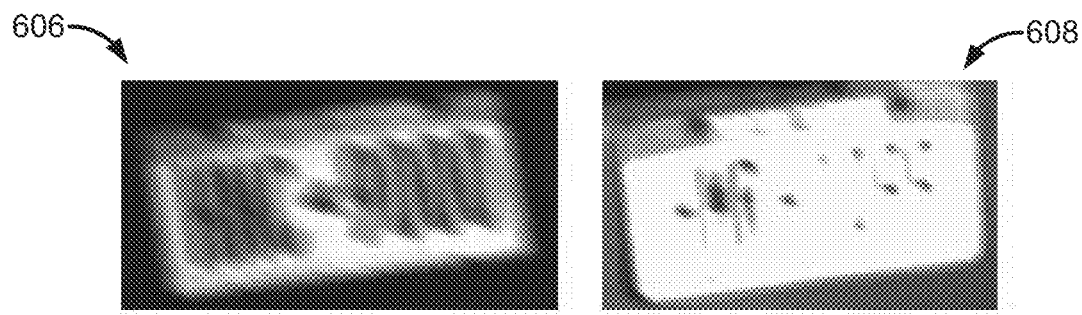
FIG. 6B are black-and-white images showing a cropped video frame of a license plate with a high-level of blur and a cropped video frame of a license plate with a high-level of exposure.

The plate dataset 324 can be a balanced dataset comprising many different types of license plates (see, e.g., FIGS. 6A and 6B). For example, the plate dataset 324 can comprise license plates from different U.S. states and territories, license plates from different non-U.S. countries or regions, and license plates with various character configurations or styles.

Moreover, the plate dataset 324 can comprise license plates having different plate aesthetics or configurations, even from within the same state (e.g., different types of New York license plates or different types of California license plates) or from within the same country/region (e.g., different types of Canadian license plates).

The plate dataset 324 can comprise license plates with various character configurations or styles such as differently-sized characters, double-stacked characters, or triple-stacked characters (e.g., numbers or letters). The plate dataset 324 can also comprise different types of license plates issued to medical personnel (e.g., Volunteer Ambulance Service (VAS) plates, Emergency Medical Technician (EMT) plates, M.D. plates, etc.), law enforcement personnel, municipal/state/government personnel, or diplomats.

Furthermore, the plate dataset 324 can comprise images or video frames of license plates with differing levels of blur, exposure, noise, occlusion, plate corrosion, paint loss, or a combination thereof. For example, the plate dataset 324 can comprise images or video frames of license plates with a high-level of blur or a high-level of exposure (see, e.g., FIG. 6B). Also, for example, the plate dataset 324 can comprise images or video frames of license plates with different levels of noise associated with different weather conditions (e.g., images or video frames of license plates captured in snowy conditions, rainy conditions, overcast conditions, sunny conditions, etc.).

During the training phase, the predictions made by the text-adapted vision transformer 310 concerning the license plate number of the real-life license plates can be assessed for accuracy. For example, the text-adapted vision transformer 310 can exhibit differing performance (e.g., differing levels of accuracy) based on certain features 501 of the license plate or the image/video frame containing the license plate.

The features 501 of the license plate can comprise a plate aesthetic or configuration related to a specific U.S. state or territory, a plate aesthetic or configuration related to a specific non-U.S. country or region, a character configuration or style (e.g., stacked characters, different-sized characters, etc.), a special plate configuration (e.g., a VAS plate, an EMT plate, an M.D. plate, a diplomatic plate, etc.), a level of blur associated with the image or video frame of the license plate, a level of exposure associated with the image or video frame of the license plate, and a level of noise associated with the image or video frame of the license plate, a non-English or non-standard character included in the license plate number, and a special symbol included in the license plate number.

The features 501 of the license plates that are incorrectly recognized (i.e., the license plate number is incorrectly predicted) by the text-adapted vision transformer 310 can then be aggregated and common low-accuracy plate features 505 can then be provided as inputs to the latent diffusion model 318 to improve the performance of the text-adapted vision transformer 310 in operation 506.

For example, license plates with stacked characters (e.g., double-stacked or triple-stacked characters) and license plates with a plate aesthetic or configuration related to "State X" can be determined as common low-accuracy plate features 505 that result in inaccurate predictions by an initial version or iteration of the text-adapted vision transformer 310. These common low-accuracy plate features 505 can then be provided as inputs to the latent diffusion model 318 for the latent diffusion model 318 to artificially generate a non-real license plate (see, e.g., non-real license plates 800 in FIG. 8) to further train the text-adapted vision transformer 310.

FIG. 5A illustrates that at least some of the low-accuracy plate features 505 can be initially provided as an input to a random plate number generator 328 in operation 508. The random plate number generator 328 can then generate a non-real license plate number (also referred to as a plate ID, see FIG. 8 for examples of non-real license plate numbers 802) based on any constraints associated with the low-accuracy plate features 505. For example, when one of the low-accuracy plate features 505 is a plate aesthetic or configuration related to State X, the random plate number generator 328 can generate a non-real license plate number that meets the official requirements of State X.

In some embodiments, the non-real license plate number generated can correspond to a real license plate number (i.e., the license plate number of a real vehicle) by coincidence.

Once the random plate number generator 328 has generated the non-real license plate number, the non-real license plate number and the common low-accuracy plate features 505 can be provided as part of a prompt to the latent diffusion model 318 to generate the image of the non-real license plate (see, e.g., non-real license plates 800 in FIG. 8) in operation 510.

FIG. 5A also illustrates that the latent diffusion model 318 can be trained using the plate dataset 324 (comprising the same real plate-text pairs 326) in operation 503. In some embodiments, the latent diffusion model 318 can be trained using the plate dataset 324 before the latent diffusion model 318 is used to generate images of the non-real license plates. The plate dataset 324 can be the same dataset used to train the text-adapted vision transformer 310. The latent diffusion model 318 will be discussed in more detail in relation to FIG. 7.

FIG. 5A further illustrates that the non-real license plates generated by the latent diffusion model 318 can be stored as part of a generated plate database 330. The generated plate database 330 can comprise a plurality of artificially-generated plate-text pairs 332. The artificially-generated plate-text pairs 332 can comprise images of non-real license plates (see, e.g., non-real license plates 800 in FIG. 8) artificially generated by the latent diffusion model 318 and non-real license plate numbers associated with the non-real license plates.

The method 500 can further comprise further training the text-adapted vision transformer 310 on the artificially-generated plate-text pairs 332 in operation 512. As previously discussed, the artificially-generated plate-text pairs 332 can comprise images of non-real license plates (see, e.g., non-real license plates 800 in FIG. 8) artificially generated by the latent diffusion model 318 and non-real license plate numbers (see, e.g., non-real license plate numbers 802 in FIG. 8) associated with the non-real license plates and generated by the random plate number generator 328.

Figure 5B:
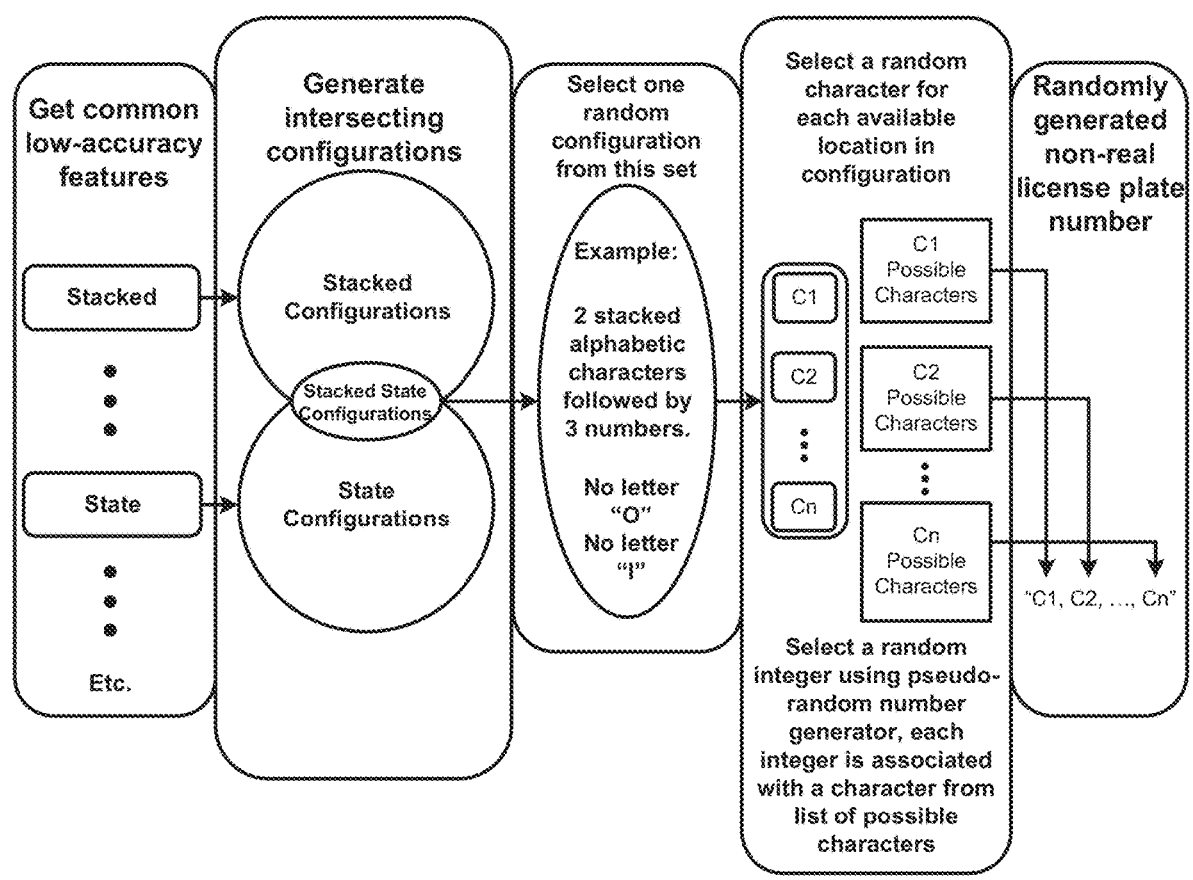
FIG. 5B is a schematic diagram illustrating a process of generating a non-real license plate number.

FIG. 5B is a schematic diagram illustrating a process of generating a non-real license plate number. The process can involve gathering a number of common low-accuracy plate features 505 and generating a set of license plate configurations that comprise such low-accuracy plate features 505. These license plate configurations can also be referred to as intersecting license plate configurations. The process can also involve selecting one random configuration from this set of license plate configurations/intersecting license plate configurations and selecting a random character for each available location or character space in the randomly selected license plate configuration.

In some embodiments, all possible characters (e.g., for a particular state or country) can be associated or linked with an integer between 1 and the number of possible characters (e.g., "n"). A computer-based random number generator can then be used to generate a random integer (between 1 and n) used to select the random character for each available location or character space in the randomly selected license plate configuration.

In certain embodiments, the computer-based random number generator can be a pseudo-random number generator module from a Python library, a PyTorch library, or a NumPy library. As a more specific example, the pseudo-random number generator module can use a Mersenne Twister pseudo-random number generator or an Xorshift pseudo-random number generator as the core generator.

Referring back to FIG. 5A, the latent diffusion model 318 can generate images of the non-real license plates by taking into account (or by receiving as inputs) the non-real license plate numbers generated by the random plate number generator 328 and one or more low-accuracy plate features 505. The non-real license plate numbers generated by the random plate number generator 328 and the one or more low-accuracy plate features 505 can be included as part of a prompt provided to the latent diffusion model 318 during a conditioning step of the latent diffusion model 318.

The one or more low-accuracy plate features 505 can be selected or changed based on an accuracy or accuracy rate of predictions made by the text-adapted vision transformer 310 (i.e., an accuracy of the license plate numbers recognized/predicted by the vision transformer 310). For example, as the performance of the text-adapted vision transformer 310 improves after each training epoch (each pass of the training data), new low-accuracy plate features 505 can be uncovered or discovered. In this manner, the training data used to train the vision transformer 310 can be iteratively updated such that new images of non-real license plates (those that result in erroneous recognition by the vision transformer 310) are constantly being added to the training data to continuously finetune the text-adapted vision transformer 310.

By continuously training the text-adapted vision transformer 310 in this manner, the model is able to adapt to new domains where poorly performing plate features are iteratively expanded in the training dataset with no human input necessary. This creates a feedback loop where newly trained versions of the text-adapted vision transformer 310 improve their performance relative to earlier versions of the vision transformer 310 in response to new non-real license plates being added to the training dataset that incorporate license plate features that brought down the accuracy rate of the earlier versions of the vision transformer 310.

One technical problem faced by the applicant is how to design an automated license plate recognition system that can effectively recognize license plates that come in a seemingly infinite number of configurations and styles (in the United States and the rest of the world). One technical solution discovered and developed by the applicant is the system disclosed herein where a text-adapted vision transformer is initially trained on a plate dataset comprising real plate-text pairs and this training data is iteratively expanded and updated with artificially-generated plate-text pairs comprising images of license plates generated by the latent diffusion model. The latent diffusion model can receive as inputs low-accuracy plate features that previously caused the text-adapted vision transformer to perform poorly. When the text-adapted vision transformer is continuously trained in this way, the model becomes automatically adaptable (robust to unseen license plate configurations) and generalizable (no large gap in performance between license plates in a standard configuration and license plates in low-occurrence configurations).

Below is a table (Table 1) showing the result of a study that compared the performance of the text-adapted vision transformer disclosed herein against a competing ALPR solution currently available in the marketplace. The study looked at recognition accuracy for both stacked plates (license plates containing at least two characters oriented vertically or any number of characters smaller than the others) and non-stacked plates (license plates where all characters are of the same height and no characters are oriented vertically relative to others).

TABLE 1

| Model | Non-Stacked Plates (accuracy of recognition) | Stacked Plates (accuracy of recognition) |
| --- | --- | --- |
| Competing ALPR Technology | 95.5% | 85.0% |
| Vision Transformer | 97.1% | 99.2% |

As can be seen from Table 1 above, the text-adapted vision transformer disclosed herein outperformed the competing ALPR technology for both non-stacked (a 1.6% increase in accuracy) and stacked plates (a 14.2% increase in accuracy) in terms of accuracy. For stacked plates, in particular, the text-adapted vision transformer disclosed herein greatly outperformed the competing ALPR technology in terms of accuracy.

FIG. 6A illustrates example license plates with differing U.S. state plate aesthetics or configurations 600, differing non-U.S. country or region plate aesthetics or configurations 602, and differing plate character configurations or styles 604 (e.g., plates with stacked characters, license plates with different sized characters, plates with special characters or symbols, etc.). As previously discussed, the text-adapted vision transformer 310 and the latent diffusion model 318 can be trained on a plate dataset 324 comprising all different types of license plates. For example, the plate dataset 324 can comprise a multitude of license plates with differing U.S. state plate aesthetics or configurations 600, license plates with differing non-U.S. country or region plate aesthetics or configurations 602, and license plates with differing plate character configurations or styles 604.

In some embodiments, the license plates can be stored in the plate dataset 324 as real plate-text pairs 326. The real plate-text pairs 326 can comprise images or video frames of real-life license plates and an annotated license plate number associated with each of the real-life license plates. For example, the annotated license plate number can be the actual license plate number of the real-life license plate, corroborated by a human reviewer or corroborated by one or more automated license plate recognition systems or procedures.

FIG. 6B are black-and-white images showing a cropped video frame of a license plate with a high-level of blur 606 and a cropped video frame of a license plate with a high-level of exposure 608. The plate dataset 324 can also comprise cropped images or video frames of license plates with differing levels of blur 606, differing levels of exposure 608, differing levels of noise (for example, noise caused by differing weather conditions such as snow, rain, overcast conditions, or sunny conditions), differing levels of occlusion, differing levels of corrosion associated with the license plate in the cropped image or video frame, and differing levels of paint loss associated with the license plate in the cropped image or video frame.

Figure 7:
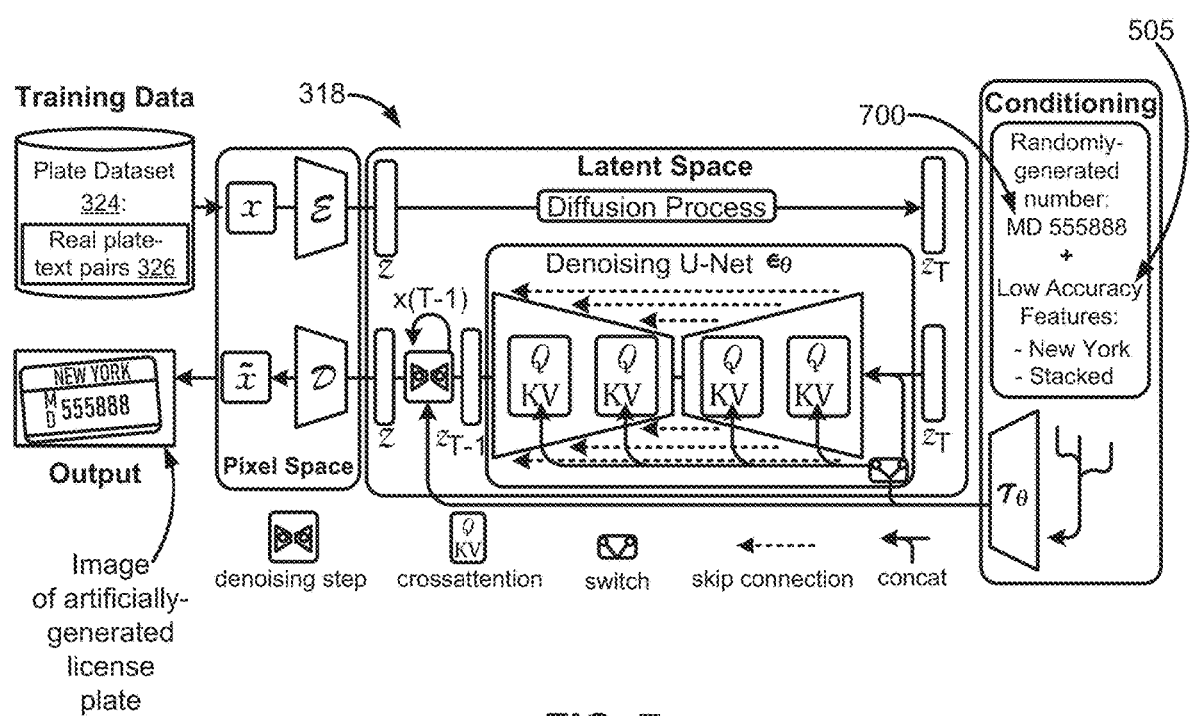
FIG. 7 illustrates a schematic diagram of one embodiment of a latent diffusion model in operation.

FIG. 7 illustrates a schematic diagram of one embodiment of the latent diffusion model 318 in operation. As previously discussed, the latent diffusion model 318 can be used to generate images of non-real license plates (see FIG. 8 for example images of non-real license plates 800 generated by the latent diffusion model 318).

In some embodiments, the latent diffusion model 318 can be a deep learning text-to-image diffusion model. For example, the latent diffusion model 318 can be a modified version of the Stable Diffusion model. A more detailed discussion of the Stable Diffusion model can be found in Rombach, Robin, et al. "High-resolution image synthesis with latent diffusion models." *Proceedings of the IEEE/CVF conference on computer vision and pattern recognition.* 2022, the content of which is incorporated herein by reference in its entirety.

The latent diffusion model 318 can be trained on the plate dataset 324 used to train the text-adapted vision transformer 310. The plate dataset 324 can comprise real plate-text pairs 326 comprising images or video frames of real-life license plates and an annotated license plate number associated with each of the real-life license plates.

In some embodiments, the latent diffusion model 318 can be trained prior to training the text-adapted vision transformer 310. The latent diffusion model can be a deep learning algorithm that is trained using a large corpus of real plate-text pairs 326 to generate a highly realistic image of a license plate based on an input prompt provided to the latent diffusion model.

One technical problem faced by the applicant is how to increase the amount of training data available to the text-adapted vision transformer 310 to improve the performance of the vision transformer 310. One technical solution discovered and developed by the applicant is to use a latent diffusion model 318 (e.g., the Stable Diffusion model) to generate images of non-real license plates based on inputs aggregated from past recognitions undertaken by the text-adapted vision transformer 310.

For example, as shown in FIG. 7, the latent diffusion model 318 can receive a prompt during the model's conditioning phase or step. The prompt can be made of a randomly-generated non-real license plate number 700 generated by the random plate number generator 328 and one or more low-accuracy plate features 505 aggregated from difficult-to-recognize license plates.

The conditioning phase or step can involve creating a representation of the prompt (which includes the randomly-generated non-real license plate number 700 and the low-accuracy plate features 505) and feeding the representation to the denoising steps of the latent diffusion model 318. This conditions the denoising steps so that the image generated by the latent diffusion model 318 is in line with the prompt.

In some embodiments, the latent diffusion model 318 can be conditioned using a classifier free guidance approach (see Ho, Jonathan, and Tim Salimans. "Classifier-free diffusion guidance." arXiv preprint arXiv: 2207.12598. 2022, the content of which is incorporated herein by reference in its entirety). For example, at each denoising step, the classifier free guidance approach can involve generating two images, one prompt-guided image and one unprompted image. The latent image fed to the next step can be the prompt-guided image minus the unprompted image. These steps better align the generated image with the prompt.

In some embodiments, the low-accuracy plate features 505 can be extracted automatically from multiple images or video frames of license plates that were erroneously recognized by the text-adapted vision transformer 310. For example, the low-accuracy plate features 505 can be plate features that are shared amongst the erroneously recognized license plates. For example, images or video frames of license plates that were erroneously recognized by the text-adapted vision transformer 310 can have all of their license plate features 501 extracted or classified using a license plate classifier run on the server 104. As a more specific example, the license plate classifier can be the license plate classifier disclosed in U.S. patent application Ser. No. 18/305,951, filed on Apr. 24, 2023, the content of which is incorporated herein by reference in its entirety.

The license plate classifier can be a multi-headed neural network having a shared or single feature extractor or encoder and a plurality of decoders or prediction heads. In some embodiments, the shared feature extractor or encoder can comprise a convolutional backbone. As a more specific example, the convolutional backbone can be a residual network such as the ResNet-18 convolutional neural network. In other embodiments, the residual network can be the ResNet-34, ResNet-50, ResNet-101, ResNet-110, ResNet-152, or ResNet-164 network.

Each of the prediction heads of the license plate classifier can make a multi-class prediction concerning the license plate features 501 detected in the images or video frames. The license plate features 501 that are most common among the license plates that were erroneously recognized by the text-adapted vision transformer 310 can then be considered the common low-accuracy plate features 505.

Additionally, or alternatively, the common low-accuracy plate features 505 can also be determined manually or determined using a combination of manual and automated techniques.

Figure 8:
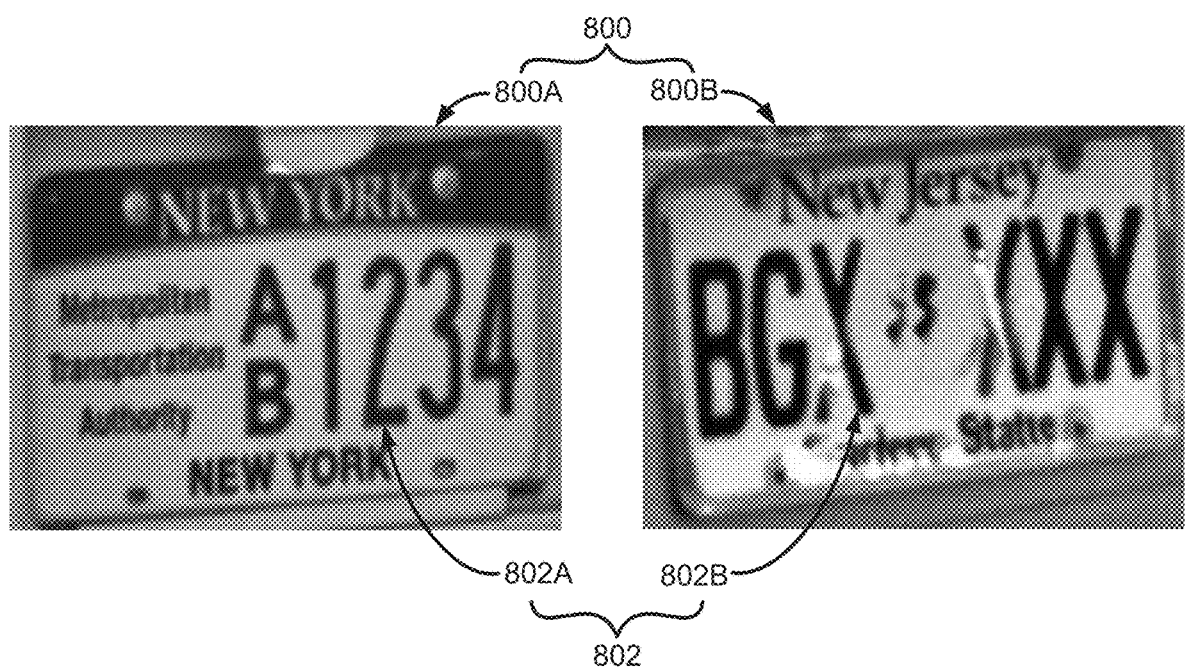
FIG. 8 illustrates two example images of non-real license plates artificially generated by the latent diffusion model.

FIG. 8 illustrates two example images of non-real license plates 800 (e.g., non-real license plate 800A and non-real license plate 800B) artificially generated by the latent diffusion model 318. As shown in FIG. 8, the non-real license plates 800 can each comprise a non-real license plate number 802 (e.g., non-real license plate number 802A and non-real license plate number 802B) generated by the random plate number generator 328 (see, e.g., FIGS. 3 and 5). As previously discussed, the images of the non-real license plates 800 can be generated by the latent diffusion model 318 based on prompts comprising the non-real license plate numbers 802 and one or more low-accuracy plate features 505.

With respect to non-real license plate 800A, the latent diffusion model 318 received a prompt to generate an image of a New York MTA-type license plate having stacked letters and using the randomly generated non-real license plate number 802A of "AB 1234."

With respect to non-real license plate 800B, the latent diffusion model 318 received a prompt to generate an image of a New Jersey license plate using the randomly generated non-real license plate number 802B of "BGX XXX."

Both non-real license plates 800 can be included in the generated plate database 330 (see FIG. 5A) or otherwise provided as training data in order to fine-tune or further train the text-adapted vision transformer 310 to improve the accuracy of the model.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps or operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to +0.1%, +1%, +5%, or +10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. One or more non-transitory computer-readable media comprising instructions stored thereon, that when executed by one or more processors, cause the one or more processors to perform operations comprising:
    dividing an image or video frame comprising a license plate in the image or video frame into a plurality of image patches, wherein the image or video frame is divided horizontally and vertically to obtain the image patches, and wherein at least one of the image patches comprises a portion of a character of a license plate number of the license plate;
    determining a positional vector for each of the image patches, wherein the positional vector represents a spatial position of each of the image patches in the image or video frame;
    adding the positional vector to each of the image patches and inputting the image patches and their associated positional vectors to a transformer encoder of a text-adapted vision transformer run on one or more devices; and
    obtaining a prediction, outputted by the text-adapted vision transformer, concerning the license plate number of the license plate.

2. The one or more non-transitory computer-readable media of claim 1, wherein the image or video frame is divided horizontally and vertically into a N×N grid of image patches, wherein N is an integer between 4 and 256.

3. The one or more non-transitory computer-readable media of claim 2, wherein the text-adapted vision transformer comprises a linear projection layer, wherein the linear projection layer is configured to flatten each image patch of the N×N grid of image patches to $1 \times ((H/N) \times (W/N))$, wherein a resulting input to the transformer encoder is then $M \times 1 \times ((H/N) \times (W/N))$, wherein H is a height of the image or video frame in pixels, wherein W is a width of the image or video frame in pixels, and wherein M is equaled to N multiplied by N.

4. The one or more non-transitory computer-readable media of claim 3, further comprising adding a two-dimensional vector representing a spatial position of each of the image patches to the image patches.

5. The one or more non-transitory computer-readable media of claim 1, wherein the text-adapted vision transformer is run on an edge device, wherein the edge device is coupled to a carrier vehicle, and wherein the image or video frame is captured using one or more cameras of the edge device while the carrier vehicle is in motion.

6. The one or more non-transitory computer-readable media of claim 1, wherein the text-adapted vision transformer is run on a server, wherein the image or video frame is captured using one or more cameras of an edge device communicatively coupled to the server, wherein the image or video frame is transmitted by the edge device to the server, wherein the edge device is coupled to a carrier vehicle, and wherein the image or video frame is captured by the one or more cameras of the edge device while the carrier vehicle is in motion.

7. The one or more non-transitory computer-readable media of claim 1, wherein each character of the license plate number is separately predicted by the transformer encoder of the text-adapted vision transformer.

8. The one or more non-transitory computer-readable media of claim 1, wherein the text-adapted vision transformer is trained on a plate dataset comprising a plurality of real plate-text pairs, wherein the real plate-text pairs comprise images or video frames of real-life license plates and an annotated license plate number associated with each of the real-life license plates.

9. The one or more non-transitory computer-readable media of claim 8, wherein the real-life license plates in the plate dataset comprise license plates with differing U.S. state plate aesthetics or configurations, license plates with differing non-U.S. country or region plate aesthetics or configurations, license plates with differing plate character configurations or styles, license plates with differing levels of blur associated with the images or video frames, and license plate with differing levels of exposure associated with the images or video frames.

10. The one or more non-transitory computer-readable media of claim 8, wherein the text-adapted vision transformer is pre-trained on a plurality of image-text pairs prior to being trained on the plate dataset, wherein the image-text pairs comprise images or video frames of real-life objects comprising text and an annotation of the text.

11. The one or more non-transitory computer-readable media of claim 8, wherein the text-adapted vision transformer is further trained on artificially-generated plate-text pairs, wherein the artificially-generated plate-text pairs comprise images of non-real license plates artificially generated by a latent diffusion model and a non-real license plate number associated with each of the non-real license plates.

12. The one or more non-transitory computer-readable media of claim 11, wherein the latent diffusion model is trained using the plate dataset used to train the text-adapted vision transformer.

13. The one or more non-transitory computer-readable media of claim 11, wherein the non-real license plate number is generated by a random plate number generator, and wherein at least one of the images of the non-real license plates is generated based on the non-real license plate number and one or more plate features provided as inputs to the latent diffusion model.

14. The one or more non-transitory computer-readable media of claim 13, wherein the one or more plate features comprise at least one of a U.S. state plate aesthetic or configuration, a non-U.S. country or region plate aesthetic or configuration, a plate configuration or style, a level of noise associated with a license plate image, a level of blur associated with the license plate image, and a level of exposure associated with the license plate image.

15. One or more non-transitory computer-readable media comprising instructions stored thereon, that when executed by one or more processors, cause the one or more processors to perform operations comprising:
pre-training a text-adapted vision transformer on a plurality of image-text pairs, wherein the image-text pairs comprise images or video frames of real-life objects comprising text and an annotation of the text;
training the text-adapted vision transformer on a plate dataset comprising a plurality of real plate-text pairs, wherein the real plate-text pairs comprise images or video frames of real-life license plates and an annotated license plate number associated with each of the real-life license plates; and
further training the text-adapted vision transformer on artificially-generated plate-text pairs, wherein the artificially-generated plate-text pairs comprise images of non-real license plates artificially generated by a latent diffusion model and a non-real license plate number associated with each of the non-real license plates.

16. The one or more non-transitory computer-readable media of claim 15, wherein the non-real license plate number is generated by a random plate number generator, and wherein at least one of the images of the non-real license plates is generated based on the non-real license plate number and one or more plate features provided as inputs to the latent diffusion model.

17. The one or more non-transitory computer-readable media of claim 16, wherein the one or more plate features comprise at least one of a U.S. state plate aesthetic or configuration, a non-U.S. country or region plate aesthetic or configuration, a plate character configuration or style, a level of blur associated with the artificially-generated image, and a level of exposure associated with the artificially-generated image.

18. The one or more non-transitory computer-readable media of claim 16, wherein the one or more plate features are selected or changed based on an accuracy of predictions made by the text-adapted vision transformer.

19. The one or more non-transitory computer-readable media of claim 18, wherein the instructions further cause the one or more processors to perform operations comprising providing a prompt to the latent diffusion model to generate additional images of non-real license plates based in part on common plate features resulting in low accuracy predictions made by the text-adapted vision transformer.

20. The one or more non-transitory computer-readable media of claim 15, wherein the latent diffusion model is trained using the plate dataset used to train the text-adapted vision transformer.

* * * * *